(12) United States Patent
Kerrod et al.

(10) Patent No.: US 10,639,614 B2
(45) Date of Patent: May 5, 2020

(54) NOX REDUCING COATINGS AND METHODS FOR REDUCING NOX THEREWITH

(71) Applicant: Tronox LLC, Oklahoma City, OK (US)

(72) Inventors: Julie Kerrod, Ulceby (GB); Kim Winn, Cleethorpes (GB)

(73) Assignee: Tronox LLC, Oklahoma City, OK (US)

( * ) Notice: Subject to any disclaimer, the term of this patent is extended or adjusted under 35 U.S.C. 154(b) by 0 days.

(21) Appl. No.: 15/769,396

(22) PCT Filed: Oct. 21, 2016

(86) PCT No.: PCT/US2016/058175
§ 371 (c)(1),
(2) Date: Apr. 19, 2018

(87) PCT Pub. No.: WO2017/070507
PCT Pub. Date: Apr. 27, 2017

(65) Prior Publication Data
US 2018/0304234 A1 Oct. 25, 2018

Related U.S. Application Data

(60) Provisional application No. 62/244,217, filed on Oct. 21, 2015.

(51) Int. Cl.
*B01J 21/06* (2006.01)
*C09D 5/00* (2006.01)
(Continued)

(52) U.S. Cl.
CPC .......... *B01J 21/063* (2013.01); *B01D 53/565* (2013.01); *B01J 37/0215* (2013.01); *C09D 1/00* (2013.01);
(Continued)

(58) Field of Classification Search
CPC . B01J 21/063; B01J 37/0215; B01D 37/0215; C09D 1/00
See application file for complete search history.

(56) References Cited

FOREIGN PATENT DOCUMENTS

| CN | 101585000 | 11/2009 |
|---|---|---|
| CN | 103140288 | 6/2013 |

(Continued)

OTHER PUBLICATIONS

Dalteon et al., "Photocatalytic Oxidation of NOx Gases Using TiO2: A Surface Spectroscopic Approach", *Environmental Pollution*, 2002, vol. 120, pp. 415-422.

(Continued)

*Primary Examiner* — James A Fiorito
(74) *Attorney, Agent, or Firm* — McAfee & Taft

(57) ABSTRACT

The present disclosure relates to constructs and methods of use thereof for improving NOx reduction in air. In particular, it has been found that improvements in NOx reduction are achieved when a photocatalytic, transparent or translucent titanium dioxide sol formulation is provided as a layer over a white surface or like surface that provides high reflection of incident light. The surface may be the surface of an underlying base structure or an applied layer, such as a paint. The base to which the layer(s) is applied can be a structure that is located where NOx concentration in the atmosphere is particularly high, such as near a roadway or other areas subject to significant vehicular traffic.

22 Claims, 9 Drawing Sheets

(51) Int. Cl.
*B01D 53/56* (2006.01)
*B01J 37/02* (2006.01)
*C09D 1/00* (2006.01)
*F01N 3/08* (2006.01)

(52) U.S. Cl.
CPC .......... *C09D 5/00* (2013.01); *B01D 2257/402* (2013.01); *B01D 2257/404* (2013.01); *F01N 3/0842* (2013.01)

(56) References Cited

FOREIGN PATENT DOCUMENTS

| | | |
|---|---|---|
| EP | 1 300 374 | 4/2003 |
| WO | WO 2005/058470 | 6/2005 |
| WO | WO 2013/074984 | 5/2013 |
| WO | WO 2015/003135 | 1/2015 |

OTHER PUBLICATIONS

Office Action cited in corresponding Chinese Application No. 201680075388.9, dated Jan. 21, 2020, pp. 1-6.

NOX REDUCING COATINGS AND METHODS FOR REDUCING NOX THEREWITH

CROSS-REFERENCE TO RELATED APPLICATIONS

The present application is a U.S. National Stage of International Patent Application PCT/US2016/058175, filed Oct. 21, 2016, and claims priority to U.S. Provisional Patent Application No. 62/244,217 filed Oct. 21, 2015. The disclosures of each of the applications noted above are incorporated herein by reference in their entirety.

FIELD OF THE INVENTION

The present invention relates to reduction of NOx in an environment, and more particularly to compositions useful for NOx reduction, especially when applied as a coating on a surface.

BACKGROUND OF THE INVENTION

Air quality is an ongoing matter of concern, particularly in metropolitan and industrialized areas. Problems of air pollution are often associated with levels of carbon dioxide ($CO_2$) and particulate matter; however, nitrogen oxides (NOx) are also significant contributors to air pollution.

Nitrogen dioxide ($NO_2$) is a reactive gas that is mainly formed by oxidation of nitrogen monoxide (NO), and high temperature combustion processes (such as in car engines and power plants) are major sources of NOx (i.e., the sum of NO and $NO_2$). While the majority of NOx emissions are in the form of NO, a significant amount is in the form of $NO_2$. It is known that negative health effects can be linked to short-term exposure to $NO_2$ (e.g., changes in lung function in sensitive population groups) and long-term exposure (e.g., increased susceptibility to respiratory infection). Excess deposition of atmospheric nitrogen can lead to a surplus of N nutrient in ecosystems, which can lead to eutrophication in terrestrial and aquatic ecosystems. Nitrogen oxides also play a major role in the formation of ozone, and by contributing to the formation of secondary inorganic aerosols (i.e., through nitrate formation), NOx also can contribute the particulate matter concentration in the air.

Various steps have been taken to reduce NOx pollution, including controlling allowable NOx emissions. One NOx abatement technology that has been introduced relates to photocatalysis of NOx utilizing a catalyst in the presence of light, water, and oxygen. For example, when titanium dioxide ($TiO_2$) is exposed to ultraviolet (UV) light, electron-hole pairs are generated, facilitating reduction and oxidations reactions through the formation of adsorbed free radicals on the $TiO_2$ surface. The highly reactive radical species can degrade pollutants (such as nitrogen oxides, sulfur oxides, and volatile organic compounds) into relatively harmless substances (e.g., formation of nitrates through oxidation of NOx) without substantial consumption of the $TiO_2$ catalyst.

Photocatalytic paints and similar coating materials incorporating a photocatalyst (such as $TiO_2$) have been developed as potential media for NOx abatement and have shown varying levels of success. Nevertheless, there remains a need for further technologies for increasing NOx reduction in the air.

SUMMARY OF THE INVENTION

The present disclosure provides improvements for removing NOx from air. Methods are provided whereby NOx can be removed from the air in the vicinity of a structure by providing the structure with a photocatalytic coating. In particular, the ability of the photocatalytic coating material to remove NOx from the air is improved by providing the coating over a surface with specific features. The present disclosure thus also provides constructs that comprise a base material (e.g., a structure such as a parking garage, tunnel, or other roadside structure) at least partially coated with a photocatalytic titanium dioxide composition. The methods and constructs are particularly useful in that the photocatalytic coating material is transparent or translucent, and the surface underlying the transparent or translucent coating is provided with light reflecting properties that have been found to increase the photocatalytic activity of the titanium dioxide photocatalyst.

In some embodiments, the present disclosure relates to a layered construct. For example, the layered construct can comprise a base, a first coating layer on the base, the first coating layer being adapted to reflect at least about 60% of incident light, and a second coating layer over the first coating layer, the second coating layer being substantially transparent or translucent and comprising photocatalytic titanium dioxide. Although the exemplary embodiment is described in relation to a plurality of layers, it is understood that the first coating layer may, in some embodiments, be absent so long as the surface of the base otherwise exhibits the light reflecting properties and/or further properties described herein in relation to the first coating layer. The layered construct can be further characterized by one or more of the following statements, which statements may be combined in any number and/or grouping thereof without departing from the scope of the present disclosure.

The base can be cementitious.

The base can be wood, metal, masonry, plastic, paper, or gypsum.

The first coating layer can be a paint.

The first coating layer can have a visible color that is a shade of white.

The color of the first coating can be defined by an L* value that is greater than about 90, and/or an a* value between about −5 and +5, and/or a b* value between about −2 and about +10.

The second coating layer can comprise about 0.1% to about 30% by weight titanium dioxide.

The photocatalytic titanium dioxide can be in the form of particles having an average size of less than 100 nm.

The first coating layer can comprise a white pigment.

The second coating layer can be adapted to catalyze the oxidation of NOx.

The combination of the second coating layer over the first coating layer can be effective to catalyze the oxidation of NOx at an increased rate relative to the second coating layer by itself.

An increased rate of oxidation of NOx can arise from a synergistic effect between the first coating layer and the second coating layer.

The oxidation of NOx by the combination of the second coating layer over the first coating layer can be greater than the oxidation of NOx by the second layer by itself by at least about 10%.

In some embodiments, the present disclosure can relate to a method of removing NOx in the vicinity of a base structure. For example, such method can comprise: providing at least a portion of a surface of the base structure with a layer of a first coating material, the first coating layer being adapted to reflect at least about 60% of incident light; and providing a layer of a second coating material over the layer of the first coating material, the second coating material being substantially transparent or translucent and comprising photocatalytic titanium dioxide in an amount effective to catalyze the oxidation of at least a portion of the NOx in the vicinity of the base structure. The method can be further characterized by one or more of the following statements, which statements may be combined in any number and/or grouping thereof without departing from the scope of the present disclosure.

The base structure can be a parking garage or a roadway structure.

The first coating material can have a visible color that is a shade of white.

The color of the first coating material can be defined by an L* value that is greater than about 90, and/or an a* value between about −5 and +5, and/or a b* value between about −2 and about +10.

In some embodiments, the present disclosure can relate to a method of improving NOx reduction by a photocatalytic $TiO_2$ material. For example, the method can comprise: combining a transparent or translucent layer comprising the photocatalytic $TiO_2$ material with a further layer of a material that is adapted to reflect at least about 60% of incident light such that the transparent or translucent layer is overlying the further layer; wherein the combination of the transparent or translucent layer over the further layer is effective to catalyze the oxidation of NOx at an increased rate relative to the transparent or translucent layer by itself. The method can be further characterized by one or more of the following statements, which statements may be combined in any number and/or grouping thereof without departing from the scope of the present disclosure.

The increased rate of oxidation of NOx can arise from a synergistic effect between the transparent or translucent layer and the further layer.

The oxidation of NOx by the combination of the transparent or translucent layer over the further layer can be greater than the oxidation of NOx by the transparent or translucent layer by itself by at least about 10%.

The further layer can have a visible color that is a shade of white.

The color of the further layer can be defined by an L* value that is greater than about 90, and/or an a* value between about −5 and +5, and/or a b* value between about −2 and about +10.

BRIEF DESCRIPTION OF THE DRAWINGS

In order to provide an understanding of embodiments of the disclosure, reference is made to the appended drawings, which are not necessarily drawn to scale, which are exemplary only, and should not be construed as limiting the disclosure, and wherein.

DETAILED DESCRIPTION OF THE INVENTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

The present disclosure provides constructs that are adapted to remove nitrogen oxides (NOx) from the air. As used herein, the term "NOx" can refer to NO, $NO_2$, or the sum of nitrogen oxide species (including NO and $NO_2$) present in a sample (or in air generally). The constructs can include a base structure with a surface at least partially coated with a layer of material, the layer being transparent or translucent and including photocatalytic titanium dioxide ($TiO_2$). The surface of the base material can exhibit certain light reflecting properties as described herein. Alternatively, the base may be coated with a plurality of layers of different compositions wherein at least the outermost layer is formed of the transparent or translucent material including photocatalytic titanium dioxide. The transparent or translucent, photocatalytic layer can work synergistically with the underlying material (be it the base surface or the further coating layer) to provide improved NOx removal. The present disclosure further provides methods of removing NOx by providing such constructs in a location where NOx may be present. In particular, existing or new structures can be coated with at least one layer of a first composition that is overcoated with at least one layer of a second composition. The second composition can be transparent or translucent and include a photocatalytic material, and the first composition can exhibit properties that improve the NOx reducing effects of the photocatalytic material.

In some embodiments, the present disclosure thus provides a layered construct comprising a base, a first coating layer on the base, and a second coating layer over the first coating layer. As discussed in greater detail herein, although the construct may be characterized in relation to the two coating layers (or two coating materials used to form the layers), one or more additional layers may be included in the construct. For example, a plurality of layers of the first coating material may be applied and/or a plurality of layers of the second coating material may be applied. Moreover, additional layers may be applied between the first coating layer and the base.

Figure 1:
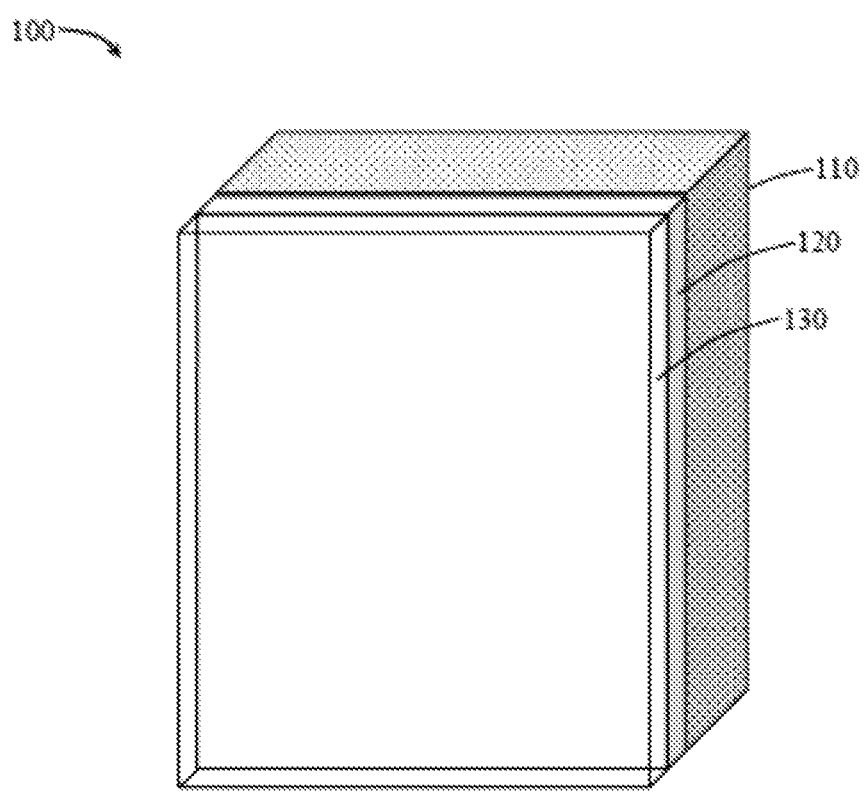
FIG. 1 is a layered construct illustrating a base coated with first and second layers according to an exemplary embodiment of the present disclosure.

A layered construct 100 according to embodiments of the present disclosure is illustrated in FIG. 1. As seen therein, a base 110 is provided with a first layer 120 (formed of a first coating material) thereon, and a second layer 130 (formed of a second coating material) is provided over the first layer. The second layer 130 is transparent or translucent.

The base 110 can be any structure that may be located in an area where NOx reduction may be desirable. The base can be an existing structure upon which the coating layers may be applied. The base can be a new structure that may intentionally be positioned in the area where NOx reduction may be desirable. Although there is no limit on the size of the structure forming the base, it is understood that the greater the amount of surface area on the structure that may be covered with the coating layers the greater the expected level of NOx reduction. All or a portion of the base may be covered with the coating layers. Preferably, the base is positioned such that the coating layers are subject to sufficient absorption of light to initiate the photocatalytic effect. It is understood in the exemplary embodiment shown in FIG. 1 that the coating layers (120 and 130) are coated onto an exposed surface of the base 110.

The base can be a structure, such as a house or a building. The base can be a structure that is particularly located in an area where increased NOx production is expected, such as an industrial location, particularly a power plant, or an area where there is automobile traffic. For example, the base can include a car parking garage or a roadway structure. It is understood that a roadway structure can include any structure positioned in the context of a roadway. Non-limiting examples of roadway structures include road surfaces, bridges and overpasses, tunnels, roadside or median barriers, road signs, toll booths, and other buildings (e.g., gas stations, convenience stores, and the like).

The base can be formed substantially of any material suitable for coating with one or a plurality of layers. For example, cementitious structures (e.g., formed using concrete or like materials) may particularly be suitable as a base. Other materials, however, are also encompassed by the present disclosure such as, but not limited to, wood, metal, and masonry. Such materials may particularly be found on exterior surfaces of a structure that may be subject UV radiation from the sun and washing with rain. The constructs of the present disclosure, however, may be suitable for interior use, such as within homes or other buildings. As such, the base may be formed substantially from other materials such as, but not limited to, plastic, paper, textile, and gypsum.

The first coating layer 120 can comprise any material suitable for forming a layer on a surface of the base—e.g., a film-forming material. Although sheet-like materials, preformed films, and the like are not excluded, for ease of formation, it can be useful for the first coating layer to be formed of a material, such as a paint or other dispersion, mixture, or solution, that may be applied to the surface of the base in substantially liquid form and allowed to dry or otherwise cure to form the layer—i.e., via spraying, rolling, brushing, dipping, or like methods.

As further described herein, the first coating layer can be beneficial for producing light scattering that improves the photocatalytic effect of the second coating layer. Thus, the first coating layer can be defined in relation to its light scattering properties. Preferably, the first coating layer is configured to reflect a major portion of incident light contacting the surface of the first coating layer. Reflection can encompass diffuse reflection (scattering at all angles) as well as specular reflection (reflection at a single angle). In some embodiments, the first coating layer can be configured to reflect at least about 60%, at least about 70%, at least about 80%, at least about 90%, at least about 95%, or at least about 98% of all incident light. Reflectance can be characterized in terms of a specific wavelength of electromagnetic radiation and/or a band of electromagnetic radiation. In some embodiments, the percentage of reflected light provided by the first coating layer may be evaluated in relation to light in the visible spectrum (about 400 to about 750 nm in wavelength). In some embodiments, reflectance of the first coating layer can be defined in relation to light in an ultraviolet band (e.g., in the range of about 100 nm to about 400 nm, or about 290 nm to about 400 nm). Preferably, the first coating layer can be adapted for reflecting light having a wavelength of about 350 to about 380 nm, about 355 nm to about 375 nm, or about 360 nm to about 370 nm. Reflectance may be evaluated utilizing, for example, a spectrophotometer, such as a LAMBDA™ 750 UV/Vis/NIR Spectrophotometer (available from Perkin Elmer). Measurement methods and data interpretation for reflectance or materials are described in ASTM E1331-15, Standard Test Method for Reflectance Factor and Color by Spectrophotometry Using Hemispherical Geometry; ASTM E1175-87(2015), Standard Test Method for Determining Solar or Photopic Reflectance, Transmittance, and Absorptance of Materials Using a Large Diameter Integrating Sphere; and ASTM G173-03(2012), Standard Tables for Reference Solar Spectral Irradiances: Direct Normal and Hemispherical on 37° Tilted Surface.

The first coating layer preferentially has a visible color that is a shade of white. As the apparent color of a material is typically understood to arise from the reflectance of visible light, it can be particularly useful to utilize a coating material adapted to reflect a substantial majority of all light within the visible spectrum, such as is typically provided by visibly white materials. As such, the coating material used in forming the first coating layer can be adapted to provide a coating layer that is pure white or off-white.

In some embodiments, the degree of "whiteness" of the coating layer can be characterized in relation to any or all of the L*, a*, and b* values. These values can be obtained in relation to the known CIE L*a*b* (CIELAB) scale developed by the International Commission on Illumination (CIE). CIELAB is an opponent color system based on the fact that retinal color stimuli are translated into distinctions between light and dark, red and green, and blue and yellow. CIELAB indicates these values with three axes: L*; a*; and b*.

It is understood that L* represents color lightness (on a scale of 0 to 100, with 0 being black and 100 being diffuse white (with values greater than 100 being possible in relation to specular white)), a* represents the scale between green and magenta (negative values indicating green and positive values indicating magenta), and b* represents the scale between yellow and blue (negative values indicating blue and positive values indicating yellow). The coating layer formed by the first coating material may exhibit an L* value that is greater than about 90, greater than about 92, or greater than about 95 (with an understood maximum L* value of 100). In particular embodiments, L* can be about 90 to 100 or about 92 to 100. In further embodiments, L* can be about 95 to about 97 or, more specifically, 95.0 to 97.5 or 95.0 to 97.0.

The coating layer that is formed by the first coating material may exhibit an a* value of about −5 to about +5, about −4 to about +4, or about −2 to about +2. In some embodiments, a* can be less than 0, such as about −5 to less than 0, about −4 to less than 0, −3 to less than 0, or −2 to less than 0. In particular, a* can be −1.50 to −0.50 or −1.00 to −0.45.

The coating layer that is formed by the first coating material may exhibit a b* value of about −2 to about +10, about −1 to about +9, or about 0 to about +8. In some embodiments, b* can be greater than 0, such as about 1 to about 5 or, more particularly, 1.0 to 4.0 or 1.0 to 2.5.

In one or more embodiments, the foregoing values for L*, a*, and b* can be combined in any manner. In other words, the coating layer can have an L* value within any of the foregoing ranges while also having an a* value within any of the foregoing ranges while further having a b* value within any of the foregoing ranges, and a person of skill would understand that suitable coating layer colors may be achieved through selection of L*, a*, and b* values from the foregoing ranges. In some embodiments, specific combinations of values may be desired based upon the time of exposure to UV light. For example, after 100 hours of exposure to UV light, a coating layer can have an L* value of 95.0 to 97.0, an a* value of −1.50 to −0.50, and a b* value of 1.0 to 4.0. As another example, after 1300 hours of exposure to UV light, a coating layer can have an L* value of 95.0 to 97.5, an a* value of −1.00 to −0.45, and a b* value of 1.0 to 2.5.

The foregoing values may be exhibited when the first coating layer is covered with the transparent or translucent second coating layer. The L*, a*, and b* values may be measured, for example, using a color-View™ Spectrophotometer (available from BYK-Gardner USA, Columbia, Md.).

In some embodiments, the first coating layer may comprise one or more pigments adapted to impart the visible shade of white. For example, titanium dioxide pigment may be included, such as TIONA™ 595 (available from Millennium Inorganic Chemicals Ltd.).

The second coating layer 130 can be formed of a material that results in a layer that is sufficiently transparent or translucent such that light may pass therethrough for reflection by the underlying material, such as the first layer (or a suitable base surface). The second coating layer comprises titanium dioxide that is in a form suitable to provide photocatalytic activity to the second coating layer. As such, the second layer may be characterized as comprising photocatalytic $TiO_2$. Examples of photocatalytic $TiO_2$ compositions include those available from Cristal under the name CristalACTiV™. Titanium dioxide colloidal sols have particularly been proven to be useful materials for forming transparent coating layers that also exhibit desired photocatalytic activity.

In some embodiments, photocatalytic $TiO_2$ can be defined in relation to one or more of its particle size, surface area, and crystalline form. For example, photocatalytic $TiO_2$ useful according to the present disclosure may have an average particle size that is less than about 100 nm, less than about 50 nm, less than about 25 nm, or less than about 10 nm (e.g., about 1 nm to about 50 nm, about 1 nm to about 40 nm, or about 2 nm to about 20 nm). Surface area preferably can be about 50 $m^2/g$, at least about 100 $m^2/g$, at least about 200 $m^2/g$, or at least about 250 $m^2/g$ (e.g., about 50 $m^2/g$ to about 500 $m^2/g$, about 100 $m^2/g$ to about 450 $m^2/g$, or about 150 $m^2/g$ to about 400 $m^2/g$). Crystalline structure preferably can be the anatase form. Particle characterization can be carried out using known techniques, such as transmission electron microscopy (TEM), X-ray diffraction spectroscopy (XRD), or light scattering techniques (such as dynamic light scattering, by Malvern Instruments Ltd., U.K.).

The concentration of the $TiO_2$ in the material forming the second layer can vary. For example, $TiO_2$ concentration can be about 0.1% by weight to about 99% by weight. In some embodiments, $TiO_2$ concentration can be about 0.1% by weight to about 30% by weight, about 1% by weight to about 20% by weight, or about 5% by weight to about 15% by weight.

Transparent or translucent $TiO_2$ sols can be provided in an aqueous solvent, particularly water or water combined with a water-miscible solvent, such as an alcohol. The material used in forming the second coating layer (including $TiO_2$ sols) may optionally include additional ingredients provided that the addition of such ingredients does not have a measurable negative impact on either the transparency or stability of the sol. Non-limiting examples of further materials that may be present in addition to $TiO_2$ and solvent can include bactericidal agents, organic solvents (e.g. alcohols), film-forming aids, sequestering agents, and pH adjusters. Materials formed of $TiO_2$ sols may be acid stabilized, base stabilized, or substantially neutral.

The material used in forming the second coating layer can be in any form wherein the resulting layer provides the requisite level of transparency or translucency and provides the requisite photocatalytic capability. In some embodiments, the second coating layer may be formed using a $TiO_2$ sol material. Transparency of the second coating layer can be characterized in relation to the amount of visible light (i.e., in the wavelength range of about 400 nm to about 700 nm) that passes through the layer. Preferably, transparency is such that at least about 50%, at least about 60%, at least about 70%, at least about 80%, or at least about 90% (e.g., about 50% to about 99%, about 60% to about 98%, or about 65% to about 95%) of light in the visible spectrum that is incident to the layer passes therethrough. Standard testing for transparency is described in ASTM D1003-13, Standard Test Method for Haze and Luminous Transmittance of Transparent Plastics. Other methods also may be employed. For example, the coating material can be applied to a clear glass substrate (e.g., a cuvette of a glass panel) by a suitable method, such as spraying or using a draw bar, to the desired coating thickness and then allowed to air dry. The so-formed samples can be tested in a UV Vis spectrometer using the same substrate (uncoated) as a blank. Transparency can be recorded as the average percent transmission over the wavelengths of 400 to 700 nm. Coatings according to the present disclosure preferably exhibit an average transmission over the wavelengths of 400-700 nm of at least about 50%, at least about 60%, at least about 70%, at least about 80%, or at least about 90% (e.g., about 50% to about 99%, about 60% to about 98%, or about 65% to about 95%).

Photocatalytic $TiO_2$ and compositions thereof (including transparent or translucent $TiO_2$ sols), as well as methods of preparing such materials are disclosed in U.S. Pat. No. 5,049,309 to Sakamoto et al., U.S. Pat. No. 6,420,437 to Mori et al., U.S. Pat. No. 6,672,336 to Ohmori et al., U.S. Pat. No. 6,824,826 to Amadelli et al., U.S. Pat. No. 7,763,565 to Fu et al., U.S. Pat. No. 7,776,954 to Stratton et al., U.S. Pat. No. 7,932,208 to Fu et al., U.S. Pat. No. 7,935,329 to Im et al., U.S. Pub. No. 2007/0155622 to Goodwin et al., U.S. Pub. No. 2011/0159109 to Lee et al., U.S. Pub. No.

2011/0183838 to Fu et al., and U.S. Pub. No. 2013/0122074 to Kerrod et al., the disclosures of which are incorporated herein by reference. Such materials particularly may be utilized in forming a second coating layer as disclosed herein.

The second coating layer is provided over the first coating layer via any method suitable for forming a coating. The material forming the second coating layer may be provided as a dispersion, mixture, or solution (including a colloidal sol), that may be applied to the surface of the base in substantially liquid form and allowed to dry or otherwise cure to form the layer—i.e., via spraying, rolling, brushing, dipping, or like methods.

A layered construct according to the present disclosure can be particularly effective in reducing NOx present in a given area. The second coating layer including photocatalytic $TiO_2$ can exhibit NOx reduction capability independent of the present layered constructs. It has been found according to the present disclosure, however, that the combination of the first coating layer with its particular reflective properties with the second coating layer can provide a synergistic effect that leads to greater efficacy in NOx reduction. In particular, the NOx reduction provided by the layered construct can exceed the NOx reduction provided by the second coating layer alone by at least about 5%, at least about 10%, at least about 15%, at least about 20%, or at least about 25%.

In some embodiments, the first coating layer may be formed from a photocatalytic material, such as a photocatalytic paint. Various photocatalytic paints are known in the art, such as BOYSEN® KNOxOUT™ paint (from Pacific Paint (Boysen) Philippines, Inc.), which includes CristalAC-TiV™ $TiO_2$. It has been found according to the present disclosure, however, that the combination of the first coating layer (when exhibiting reflective properties as described herein) with the second coating layer (being transparent or translucent and including photocatalytic $TiO_2$) can provide a synergistic effect that leads to greater efficacy in NOx reduction. Such effect is seen when the first coating layer is itself a photocatalytic material exhibiting NOx reduction properties. In particular, the NOx reduction provided by the layered construct can exceed the NOx reduction provided by the first coating layer alone by at least about 5%, at least about 10%, at least about 15%, at least about 20%, or at least about 25%.

Reduction of NOx within the vicinity of a structure is understood to mean that air circulating past the coated structure may contact the outer coating layer sufficiently for oxidation of any NOx present in the air by the photocatalyst. It is further understood that the so-affected air may circulate away from the structure, and the result is that over time, the air has an overall lower level of NOx. For purposes of evaluation according to the present disclosure, NOx reduction in the vicinity of a construct as described herein can mean NOx reduction within a radius of 100 m, 10 m, 1 m, or 0.5 m of the coated base structure. Testing for NOx reduction can be carried out according to known methods, such as the methods described in ISO 22197-1:2007, Fine ceramics (advanced ceramics, advanced technical ceramics)—Test method for air-purification performance of semiconducting photocatalytic materials—Part 1: Removal of nitric oxide. Further methods suitable for testing NOx reduction are described in the appended Examples. Moreover, methods for determining NOx removal are described in U.S. Pub. No. 2007/0167551 to Goodwin et al., the disclosure of which is incorporated herein by reference in its entirety.

In some embodiments, a construct according to the present disclosure can provide for reduction in the amount of NOx in ambient air, such reduction being at least about 10%, at least about 20%, at least about 30%, at least about 40%, or at least about 50%. The reduction may be based on an average measured NOx concentration in ppm (by volume) over a defined period of time. For example, if a baseline concentration of NOx at a location averaged over an hour was 1 ppm (by volume), and if after locating a construct according to the present disclosure at the same location the NOx concentration averaged over an hour was 0.5 ppm (by volume), it would be understood that the presence of the construct had achieved a NOx reduction of about 50%.

Even when the first coating layer and the second coating layer exhibit NOx reduction properties associated with the photocatalytic effect, it is unexpected that the layered combination would provide synergistic effects. This is because the first coating layer, when covered by the second coating layer, would not be expected to provide substantially any catalytic effect since the second coating layer would prevent catalytic contact of the first coating layer with airborne materials, including NOx molecules. Rather, it has been found according to the present disclosure that improvements in NOx reduction can be provided in the layered construct when the first coating layer (regardless of any independent photocatalytic capabilities of the material) exhibits light reflecting properties as described herein (for example, is substantially a shade of white) when receiving incident light passing through the transparent or translucent second coating layer.

Although not wishing to be bound by theory, the combination of layers appears to increase photocatalytic activity in the outermost, second coating layer because light passing through the transparent or translucent second coating layer is reflected and/or otherwise scattered by the first coating layer. The scattering of light is believed to increase activity in a $TiO_2$ sol (or similar photocatalytic material) so that NOx reduction is improved in comparison to photocatalytic materials not having this multi-layer construct combining a photocatalytic, transparent or translucent outer coating layer with a light reflecting undercoating layer.

EXPERIMENTAL

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Example 1

The ability of various coating materials in various combinations to reduce NOx concentration was evaluated. Coating materials used in the evaluation are shown in TABLE 1.

TABLE 1

| Material | Description |
|---|---|
| Coating material 1 | White, styrene acrylic paint |
| Coating material 2 | White, styrene acrylic paint with added CristalACTiV ™ PC500 (80 wt %) |
| Coating material 3 | White, styrene acrylic paint with photocatalytic $TiO_2$ |
| Coating material 4 | CristalACTiV ™ PCS7: transparent $TiO_2$ sol (5 wt %) |

The paint used in coating material 1 and coating material 2 was a formulation as described in U.S. Pat. Pub. No. 2014/0322116 to Maltby et al., the disclosure of which is incorporated herein by reference in its entirety. The paint used in coating material 3 is commercially available as SIGMACARE® Cleanair Matte (available from PPG Coatings).

TESTS 1 and 8 were a layer of Coating material 1 on concrete.

TESTS 2 and 9 were a layer of Coating material 2 on concrete.

TESTS 3 and 10 were a layer of Coating material 3 on concrete.

TESTS 4 and 11 were a layer of Coating material 4 on concrete.

TESTS 5 and 12 were a layer of Coating material 1 on concrete covered with a layer of Coating material 4.

TESTS 6 and 13 were a layer of Coating material 2 on concrete covered with a layer of Coating material 4.

TESTS 7 and 14 were a layer of Coating material 3 on concrete covered with a layer of Coating material 4.

Each test sample had a surface area of approximately 18 cm$^2$, and testing was carried out using a Suntest chamber (available from Atlas Material Testing Solutions). Initial readings were taken, and follow-up readings were obtained after 200 hours, 500 hours, 800 hours, 1100 hours, 1400 hours, 1700 hours pre-rinse, and 1700 hours post-rinse aging in the Suntest chamber. During aging in the Suntest chamber, the samples were subjected to light in a spectrum of 250-765 nm at 550 w/m$^2$. For the evaluations, the samples were placed in a NOx analyzer under a flow of NO at approximately 0.7 L/min. Readings were taken under applied fluorescent light (spectrum of 400 to 750 nm) at 7.24 W/m$^2$ and under ultraviolet light (spectrum of 290 to 400 nm) at 6.63 W/m$^2$. An EnviroTech NOx Analyzer model T200 was used. Further NOx analyzers are commercially available, such as from Teledyne Technologies Incorporated, Altech Environment USA, and Emerson Process Management. The NOx analyzer consists of a sealed test chamber (e.g., a quartz tube), a light source configured for illuminating the test chamber, a source of NO gas, tubing for delivery of the NO gas to the test chamber, an analyzer configured for detecting the presence of NOx, tubing for delivery of gas from the test chamber to the analyzer, a purified air (NOx-free) source, tubing for delivery of purified air to the test chamber, an optional humidifier for delivery of water vapor to the test chamber, valves, and pumps. At least the test chamber is in a light-proof container to enable "dark" readings. For each test, NOx concentration readings were taken without the applied light and then again with the applied light to evaluate the reduction of NOx under the photocatalytic conditions.

Figure 2:
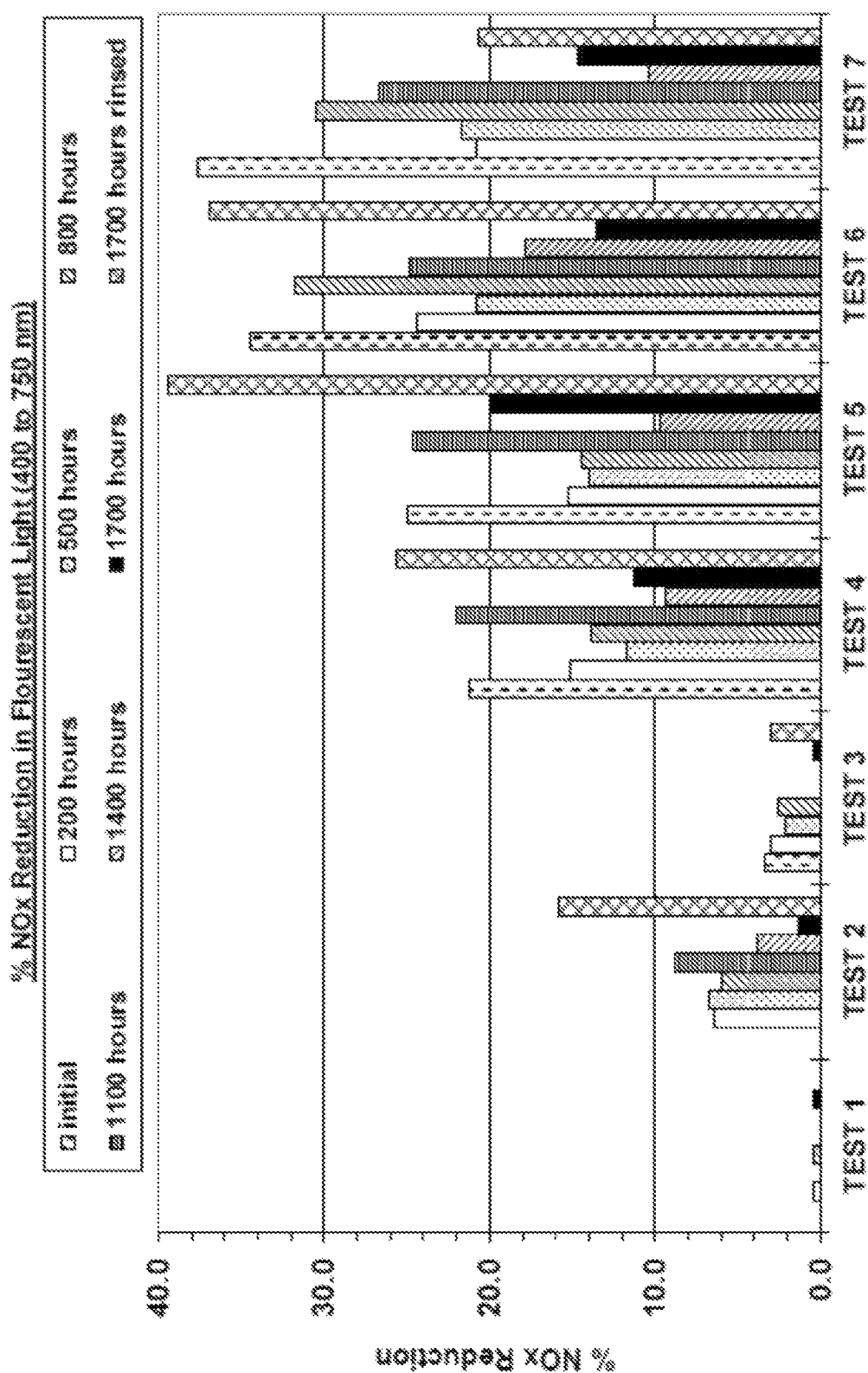
FIG. 2 is a graph showing percent NOx reduction over time by various constructs, including constructs according to exemplary embodiments of the present disclosure, when subjected to Fluorescent light.
Figure 3:
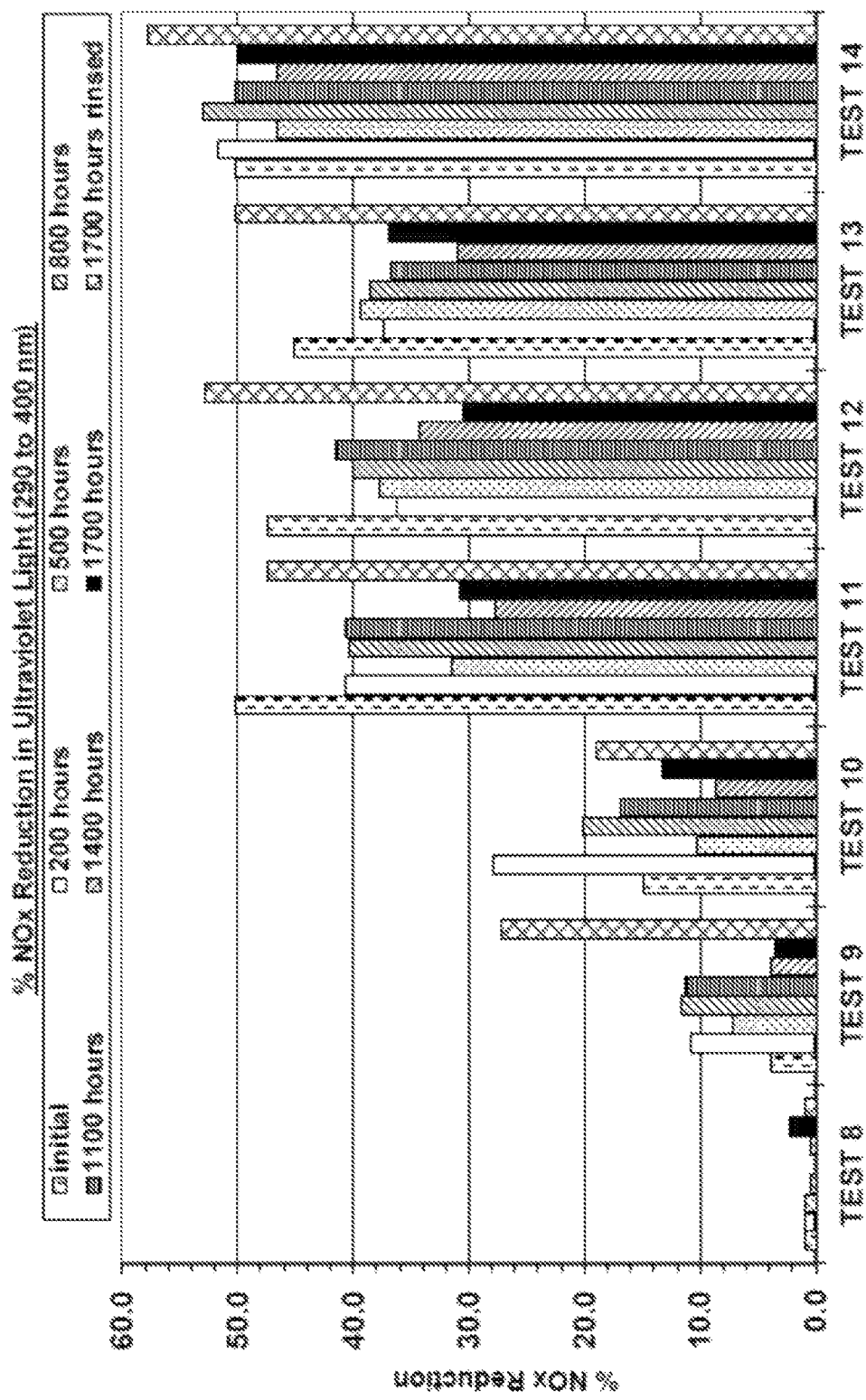
FIG. 3 is a graph showing percent NOx reduction over time by various constructs, including constructs according to exemplary embodiments of the present disclosure, when subjected to ultraviolet light.

Test result data is provided in TABLE 2 and TABLE 3 below. The test results are graphically illustrated in FIG. 2 and FIG. 3. Additionally, L*, a*, and b* values for the various test samples are provided in TABLE 4 through TABLE 6. The % NOx Reduction was calculated according to Formula 1:

$$[(D-L)/D] \times 100 \quad \text{Formula 1}$$

wherein D is the sum of NO and NO$_2$ values measured under dark conditions and L is the sum of the NO and NO$_2$ values measured while exposed to the light conditions.

Testing showed that the combination of the transparent TiO$_2$ sol over a white coating layer provided improved NOx reduction on average. Such improvement was generally identified in comparison to coatings of the white layer alone or the transparent TiO$_2$ sol alone.

TABLE 2

% NOx Reduction in Fluorescent Light (400 to 750 nm)

| | Initial | 200 h | 500 h | 800 h | 1100 h | 1400 h | 1700 h | 1700 h* |
|---|---|---|---|---|---|---|---|---|
| TEST 1 | 0.0 | 0.4 | 0.0 | 0.4 | −0.4 | 0.0 | 0.4 | 0.0 |
| TEST 2 | 0.0 | 6.5 | 6.8 | 6.0 | 8.8 | 3.8 | 1.3 | 15.7 |
| TEST 3 | 3.4 | 3.0 | 2.1 | 2.6 | −0.4 | −0.4 | 0.4 | 3.0 |
| TEST 4 | 21.2 | 15.2 | 11.8 | 13.9 | 22.0 | 9.4 | 11.3 | 25.6 |
| TEST 5 | 25.0 | 15.3 | 14.0 | 14.5 | 24.7 | 9.7 | 20.0 | 39.4 |
| TEST 6 | 34.5 | 24.3 | 20.8 | 31.8 | 24.8 | 17.8 | 13.5 | 36.9 |
| TEST 7 | 37.7 | 20.8 | 21.6 | 30.5 | 26.6 | 10.3 | 14.7 | 20.7 |

*measurement taken after rinsing debris from the surface

TABLE 3

% NOx Reduction in Ultraviolet Light (290 to 400 nm)

| | Initial | 200 h | 500 h | 800 h | 1100 h | 1400 h | 1700 h | 1700 h* |
|---|---|---|---|---|---|---|---|---|
| TEST 8 | 0.9 | 0.9 | 0.8 | 0.4 | 0.0 | 0.4 | 2.1 | 0.8 |
| TEST 9 | 3.8 | 10.8 | 7.2 | 11.5 | 11.3 | 3.8 | 3.5 | 27.2 |
| TEST 10 | 14.9 | 27.8 | 10.3 | 20.1 | 16.9 | 8.7 | 13.2 | 19.0 |
| TEST 11 | 50.2 | 40.7 | 31.5 | 40.3 | 40.7 | 27.8 | 30.7 | 47.4 |
| TEST 12 | 47.5 | 36.2 | 37.7 | 40.0 | 41.6 | 34.2 | 30.4 | 52.8 |
| TEST 13 | 45.1 | 37.4 | 39.4 | 38.5 | 36.8 | 30.9 | 37.0 | 50.2 |
| TEST 14 | 50.2 | 51.8 | 46.6 | 53.0 | 50.2 | 46.6 | 50.0 | 57.8 |

*measurement taken after rinsing debris from the surface

TABLE 4

L* Value for Samples Subjected to Ultraviolet Light (290 to 400 nm)

| | Initial | 200 h | 500 h | 800 h | 1100 h | 1400 h | 1700 h |
|---|---|---|---|---|---|---|---|
| TEST 8 | 96.6 | 96.7 | 96.5 | 96.66 | 96.35 | 96.32 | 96.48 |
| TEST 9 | 96.3 | 96.3 | 96.5 | 96.54 | 96.02 | 96.17 | 96.13 |
| TEST 10 | 96.8 | 96.9 | 97.0 | 97.02 | 96.98 | 97.08 | 96.77 |
| TEST 11 | 67.6 | 68.8 | 69.2 | 70.12 | 70.11 | 70.61 | 71.50 |
| TEST 12 | 96.1 | 96.1 | 95.9 | 96.01 | 96.12 | 95.94 | 96.09 |
| TEST 13 | 95.7 | 96.0 | 96.1 | 96.01 | 96.13 | 96.15 | 96.04 |
| TEST 14 | 95.8 | 96.1 | 96.2 | 96.30 | 96.36 | 96.49 | 96.37 |

TABLE 5 a* Value for Samples Subjected to Ultraviolet Light (290 to 400 nm)

| | Initial | 200 h | 500 h | 800 h | 1100 h | 1400 h | 1700 h |
|---|---|---|---|---|---|---|---|
| TEST 8 | −0.67 | −0.72 | −0.72 | −0.76 | −0.77 | −0.80 | −0.85 |
| TEST 9 | −0.77 | −0.88 | −0.71 | −0.73 | −0.68 | −0.67 | −0.67 |
| TEST 10 | −0.51 | −0.47 | −0.41 | −0.42 | −0.40 | −0.39 | −0.40 |
| TEST 11 | 0.76 | 0.68 | 0.73 | 0.44 | −0.43 | −0.75 | 0.87 |
| TEST 12 | −1.48 | −0.84 | −0.63 | −0.83 | −0.84 | −0.81 | −0.79 |
| TEST 13 | −1.86 | −1.06 | −0.76 | −0.84 | −0.82 | −0.80 | −0.88 |

TABLE 5-continued a* Value for Samples Subjected to
Ultraviolet Light (290 to 400 nm)

|  | Initial | 200 h | 500 h | 800 h | 1100 h | 1400 h | 1700 h |
|---|---|---|---|---|---|---|---|
| TEST 14 | −1.98 | −0.61 | −0.44 | −0.52 | −0.54 | −0.49 | −0.50 |

TABLE 6 b* Value for Samples Subjected to Ultraviolet Light (290 to 400 nm)

|  | Initial | 200 h | 500 h | 800 h | 1100 h | 1400 h | 1700 h |
|---|---|---|---|---|---|---|---|
| TEST 8 | 1.12 | 1.01 | 0.93 | 1.17 | 1.05 | 1.02 | 1.35 |
| TEST 9 | 0.90 | 1.09 | 0.72 | 0.71 | 0.57 | 0.55 | 0.53 |
| TEST 10 | 1.07 | 0.90 | 0.77 | 0.84 | 0.84 | 0.80 | 0.86 |
| TEST 11 | 13.15 | 12.99 | 12.93 | 12.24 | 12.93 | 11.98 | 12.35 |
| TEST 12 | 2.73 | 1.31 | 0.89 | 1.13 | 1.24 | 0.79 | 0.73 |
| TEST 13 | 3.22 | 1.73 | 1.02 | 0.97 | 0.92 | 0.97 | 0.84 |
| TEST 14 | 3.81 | 0.95 | 0.63 | 0.76 | 0.85 | 0.73 | 0.68 |

Example 2

The ability of various coating materials in various combinations to reduce NOx concentration was evaluated. Coating materials used in the evaluation are shown in TABLE 7.

TABLE 7

| Material | Description |
|---|---|
| Coating material 5 | White, styrene acrylic paint with TIONA ™ 595 (15 wt %) |
| Coating material 6 | White, styrene acrylic paint with TIONA ™ 595 (10 wt %) |
| Coating material 7 | White, styrene acrylic paint with TIONA ™ 595 (5 wt %) |
| Coating material 8 | White, styrene acrylic paint |
| Coating material 9 | White, styrene acrylic paint with 2% nanoTiO$_2$ |
| Coating material 10 | White, styrene acrylic paint with 4% nanoTiO$_2$ |
| Coating material 11 | White, styrene acrylic paint with 4% nanoTiO$_2$ |
| Coating material 12 | CristalACTiV ™ PCS7: transparent TiO$_2$ sol (5 wt %) |

The paint used in coating material 5, coating material 6, and coating material 7 was a formulation as described in U.S. Pat. Pub. No. 2014/0322116 to Maltby et al. The TIONA™ 595 used in coating materials 5-7 is available from Millennium Inorganic Chemicals Ltd. Coating materials 8-11 used general styrene acrylic paints with or without added nanoTiO$_2$.

TESTS 15 and 29 were a layer of coating material 5 on concrete.
TESTS 16 and 30 were a layer of coating material 6 on concrete.
TESTS 17 and 31 were a layer of coating material 7 on concrete.
TESTS 18 and 32 were a layer of coating material 8 on concrete.
TESTS 19 and 33 were a layer of coating material 9 on concrete.
TESTS 20 and 34 were a layer of coating material 10 on concrete.
TESTS 21 and 35 were a layer of coating material 11 on concrete.
TESTS 22 and 36 were a layer of coating material 5 on concrete covered with a layer of coating material 12.
TESTS 23 and 37 were a layer of coating material 6 on concrete covered with a layer of coating material 12.
TESTS 24 and 38 were a layer of coating material 7 on concrete covered with a layer of coating material 12.
TESTS 25 and 39 were a layer of coating material 8 on concrete covered with a layer of coating material 12.
TESTS 26 and 40 were a layer of coating material 9 on concrete covered with a layer of coating material 12.
TESTS 27 and 41 were a layer of coating material 10 on concrete covered with a layer of coating material 12.
TESTS 28 and 42 were a layer of coating material 11 on concrete covered with a layer of coating material 12.

Each test sample had a surface area of approximately 18 cm$^2$, and testing was carried out in the Suntest Chamber as in Example 1. Initial readings were taken, and follow-up readings were obtained after 100 hours, 400 hours, 900 hours pre-rinse, 900 hours post-rinse, and 1200 hours aging in the Suntest chamber. During aging in the Suntest chamber, the samples were subjected to light in a spectrum of 250-765 nm at 550 w/m$^2$. For the evaluations, the samples were placed in a NOx analyzer under a flow of NO at approximately 0.6 L/min. Readings were taken under applied fluorescent light (spectrum of 400 to 750 nm) at 7.24 W/m$^2$ and under ultraviolet light (spectrum of 290 to 400 nm) at 7.19 W/m$^2$. For each test, NOx concentration readings were taken without the applied light and then again with the applied light to evaluate the reduction of NOx under the photocatalytic conditions.

Figure 4:
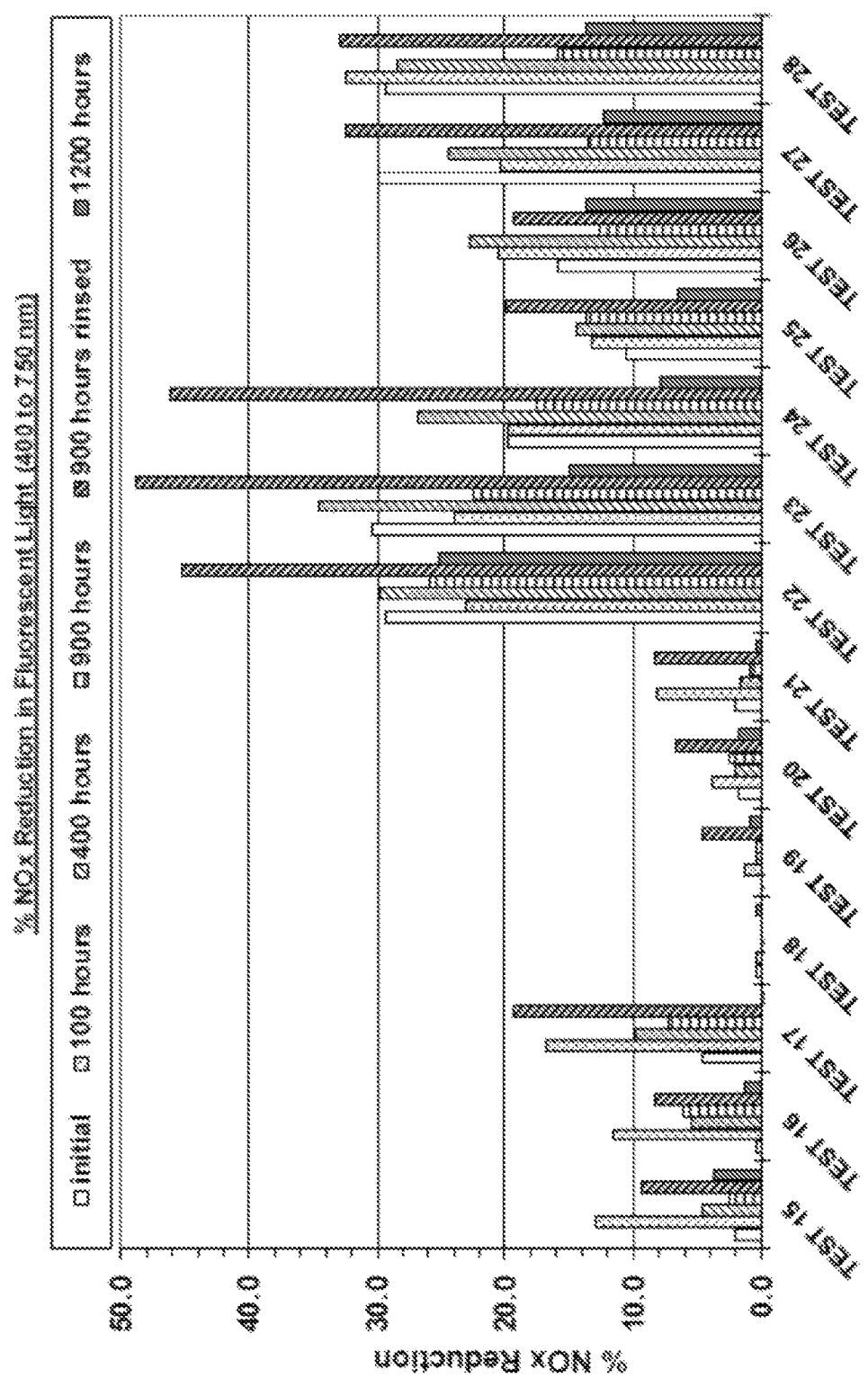
FIG. 4 is a graph showing percent NOx reduction over time by various constructs, including constructs according to exemplary embodiments of the present disclosure, when subjected to fluorescent light.
Figure 5:
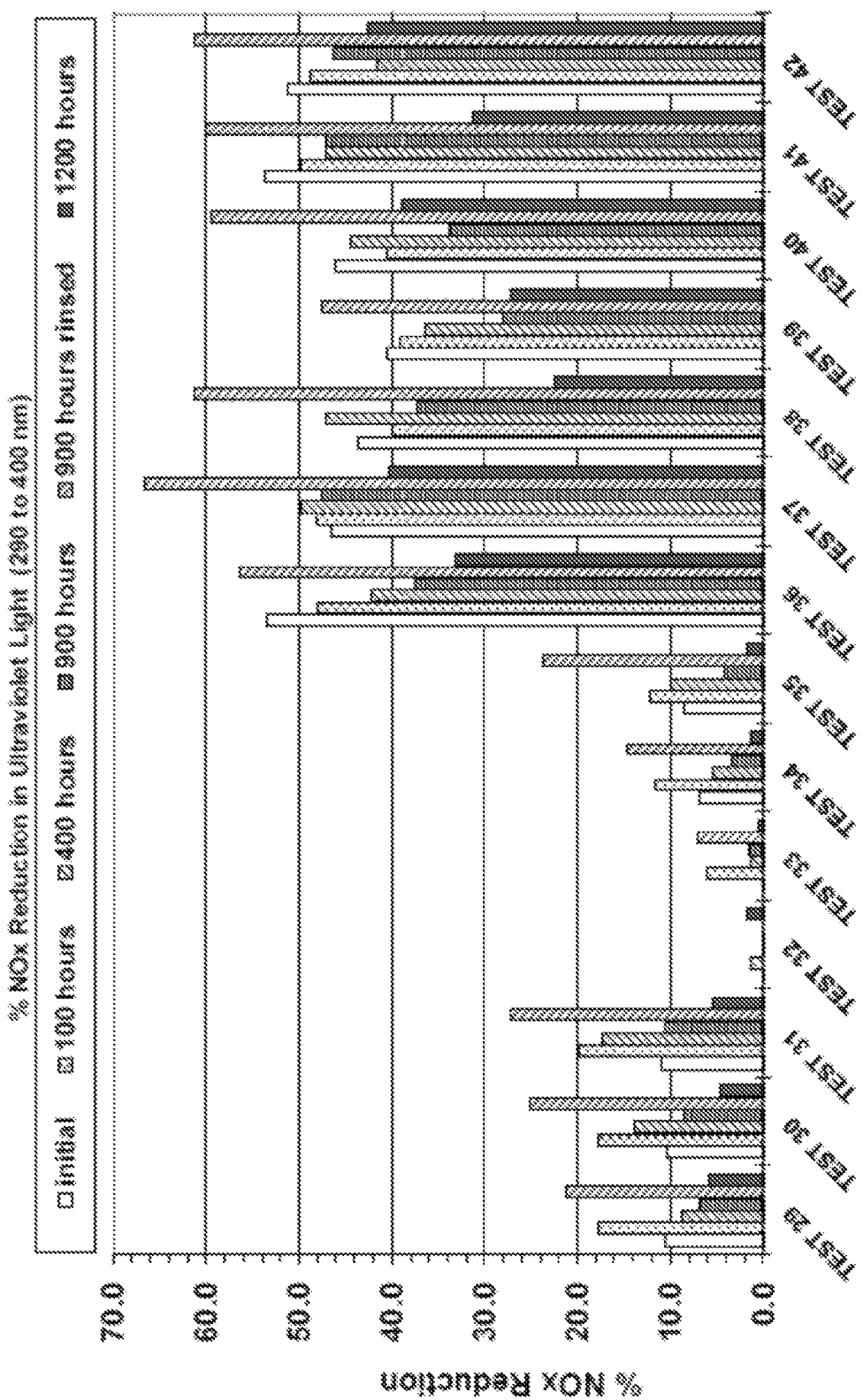
FIG. 5 is a graph showing percent NOx reduction over time by various constructs, including constructs according to exemplary embodiments of the present disclosure, when subjected to ultraviolet light.
Figure 6:
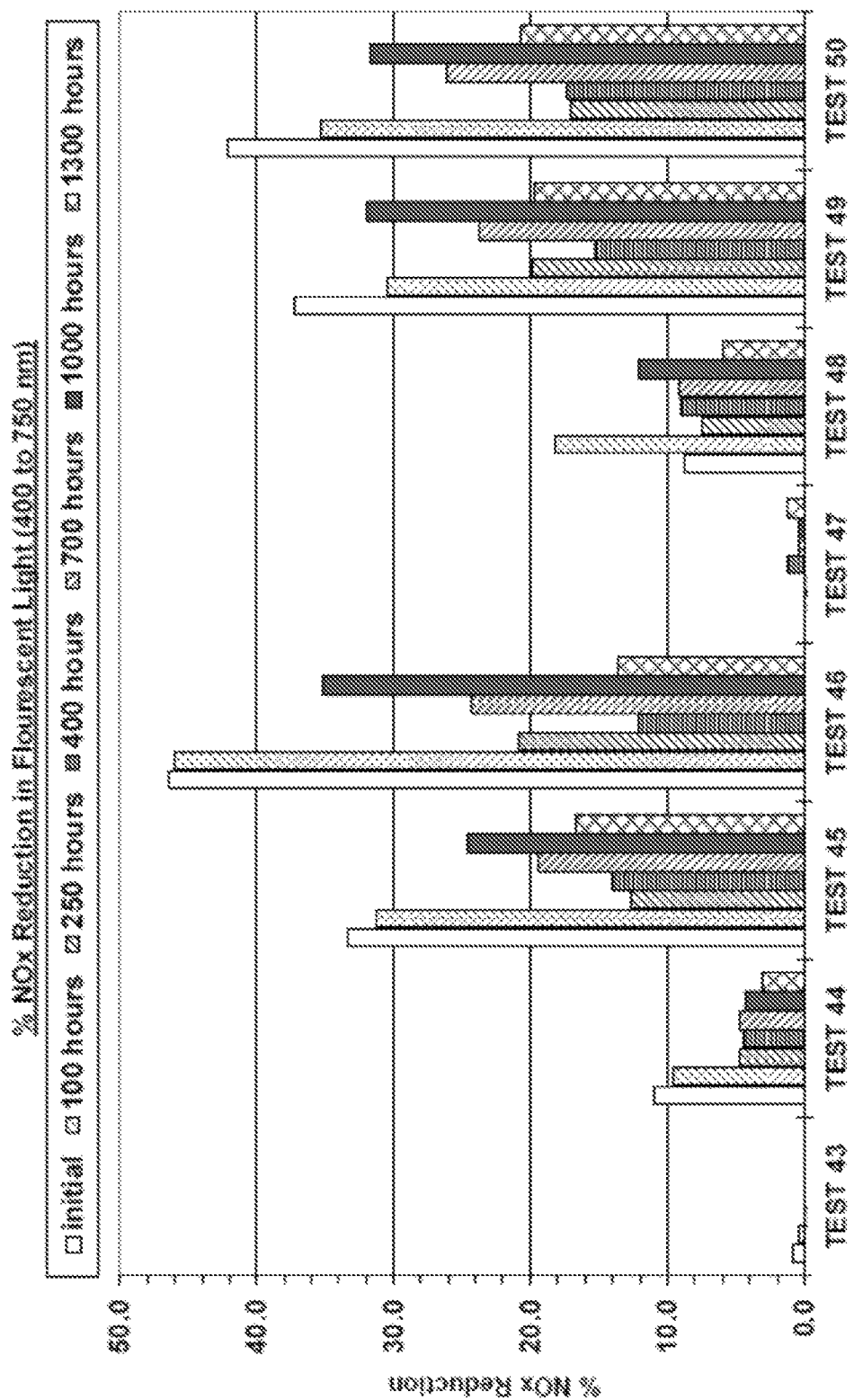
FIG. 6 is a graph showing percent NOx reduction over time by various constructs, including constructs according to exemplary embodiments of the present disclosure, when subjected to fluorescent light.
Figure 7:
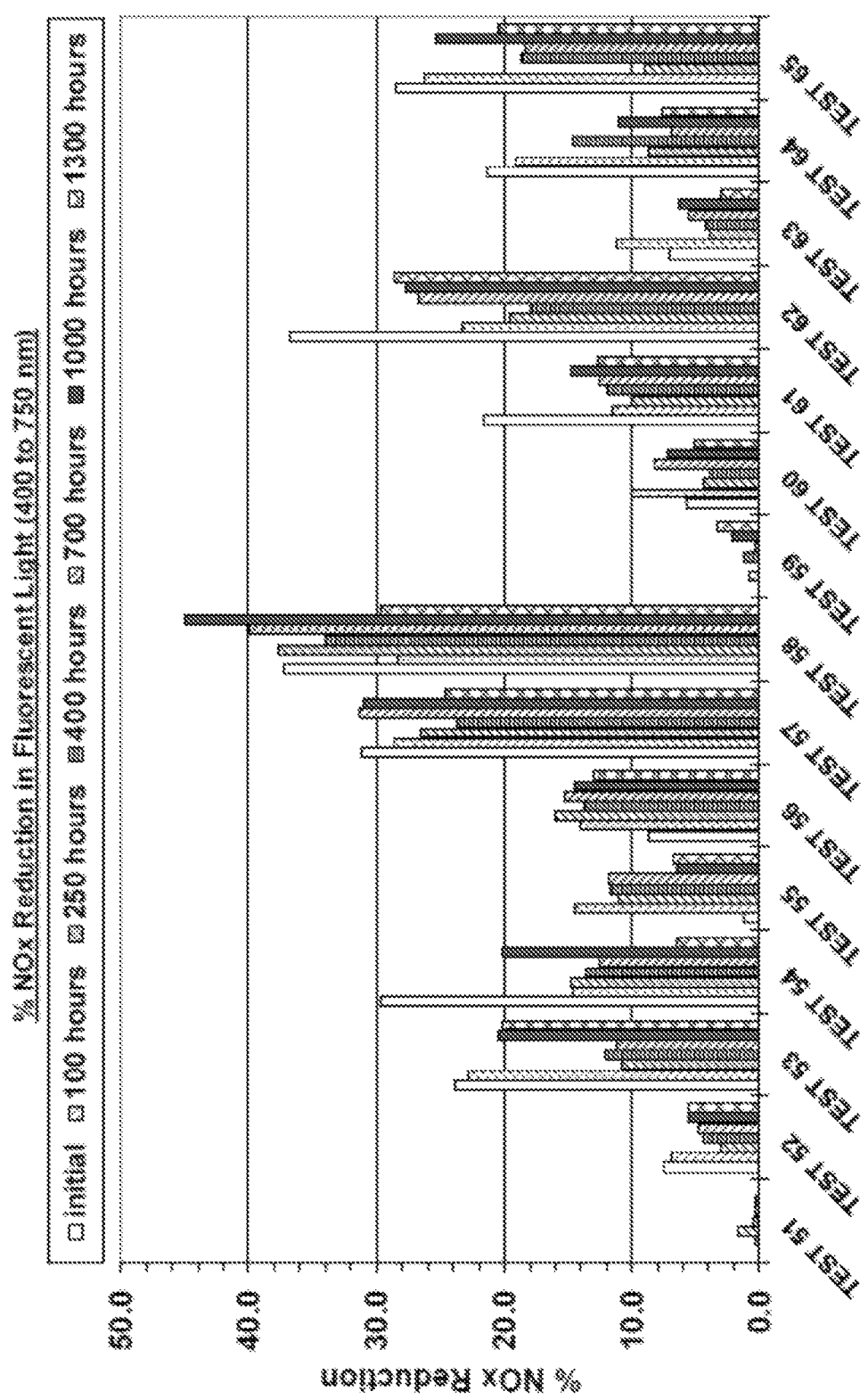
FIG. 7 is a graph showing percent NOx reduction over time by various constructs, including constructs according to exemplary embodiments of the present disclosure, when subjected to fluorescent light.
Figure 8:
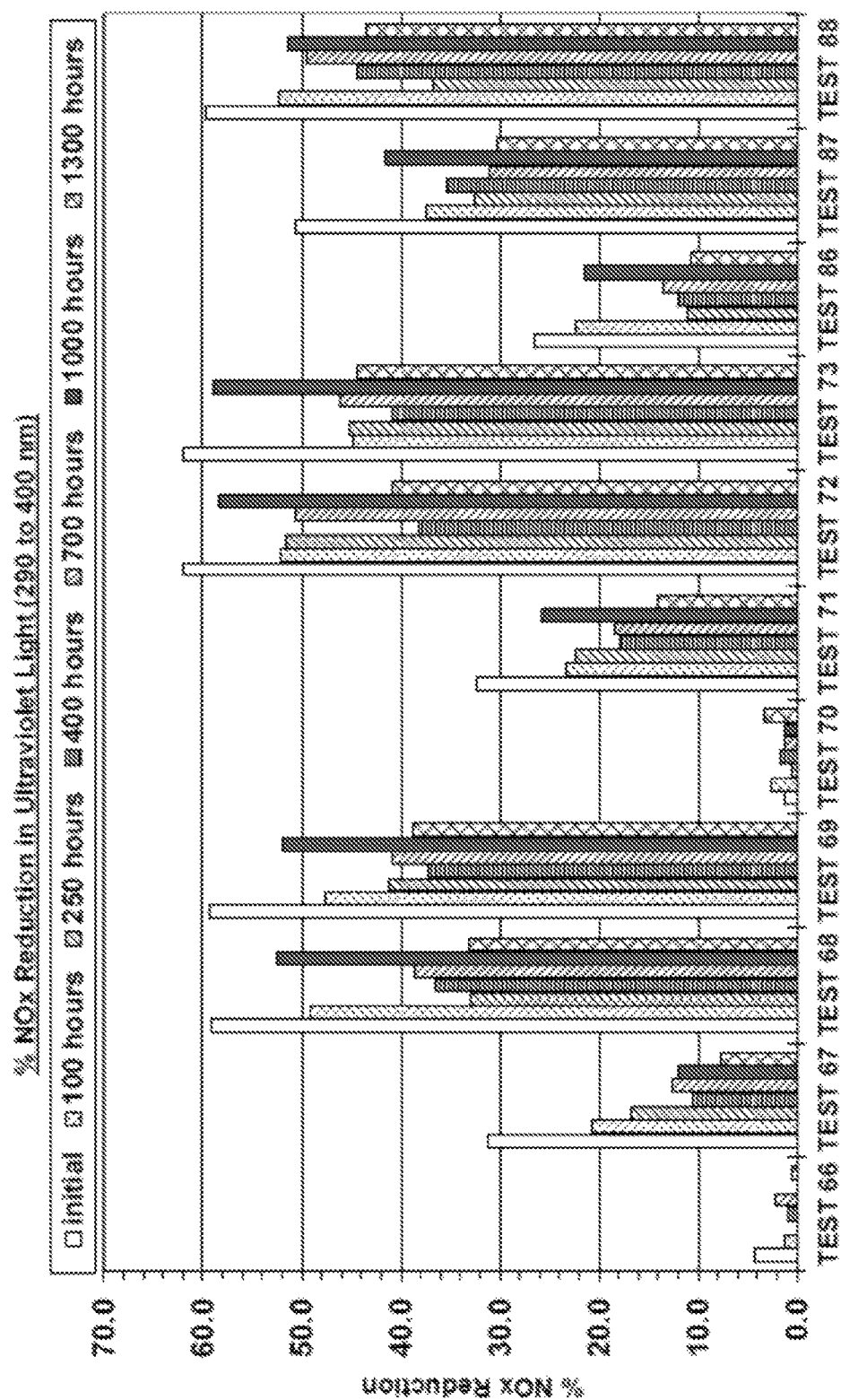
FIG. 8 is a graph showing percent NOx reduction over time by various constructs, including constructs according to exemplary embodiments of the present disclosure, when subjected to ultraviolet light.
Figure 9:
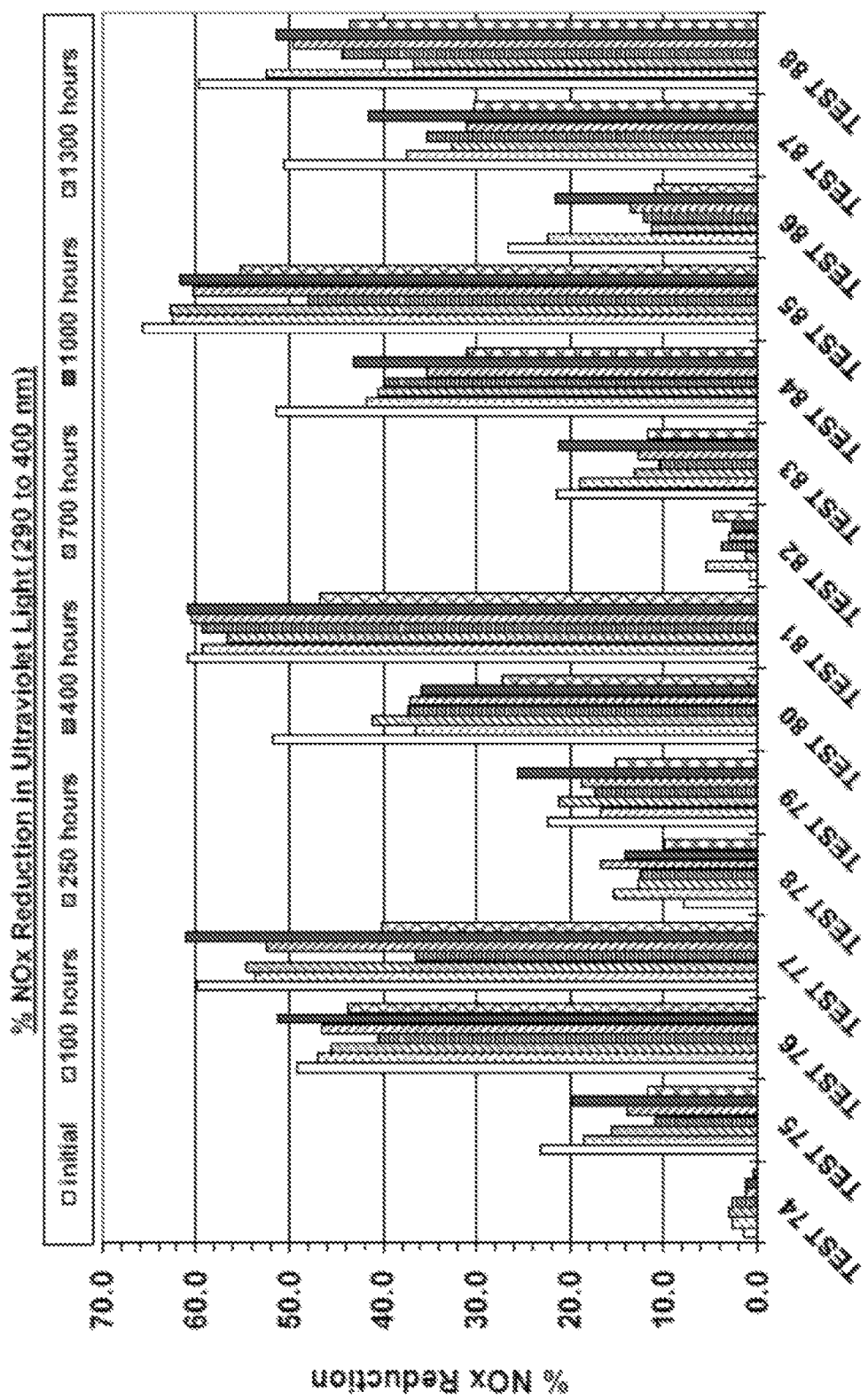
FIG. 9 is a graph showing percent NOx reduction over time by various constructs, including constructs according to exemplary embodiments of the present disclosure, when subjected to ultraviolet light.

Test result data is provided in TABLE 8 and TABLE 9 below. The test results are graphically illustrated in FIG. 4 and FIG. 5. Additionally, L*, a*, and b* values for the various test samples are provided in TABLE 10 through TABLE 12. The % NOx Reduction was calculated according to Formula 1. Testing showed that the combination of the transparent TiO$_2$ sol over a white coating layer provided improved NOx reduction on average. Such improvement was generally identified in comparison to coatings of the white layer alone.

TABLE 8

% NOx Reduction in Fluorescent Light (400 to 750 nm)

|  | Initial | 100 h | 400 h | 900 h | 900 h* | 1200 h |
|---|---|---|---|---|---|---|
| TEST 15 | 2.1 | 13.0 | 4.6 | 2.5 | 9.4 | 3.7 |
| TEST 16 | 0.4 | 11.7 | 5.4 | 6.0 | 8.2 | 1.3 |
| TEST 17 | 4.7 | 16.7 | 9.9 | 7.3 | 19.4 | −0.4 |
| TEST 18 | 0.4 | 0.4 | −0.4 | 0.0 | 0.0 | 0.4 |
| TEST 19 | −0.4 | 1.3 | 0.4 | 0.4 | 4.5 | 0.8 |
| TEST 20 | 1.7 | 3.9 | 2.1 | 2.5 | 6.7 | 1.7 |
| TEST 21 | 2.1 | 8.2 | 1.7 | 0.8 | 8.3 | 0.4 |
| TEST 22 | 29.3 | 23.1 | 29.7 | 25.8 | 45.3 | 25.2 |
| TEST 23 | 30.3 | 24.0 | 34.6 | 22.5 | 48.8 | 15.0 |
| TEST 24 | 19.8 | 19.7 | 26.9 | 17.6 | 46.1 | 7.9 |
| TEST 25 | 10.6 | 13.2 | 14.5 | 13.7 | 20.0 | 6.6 |
| TEST 26 | 15.9 | 20.5 | 22.7 | 12.7 | 19.4 | 13.6 |
| TEST 27 | 29.9 | 20.4 | 24.4 | 13.5 | 32.5 | 12.3 |
| TEST 28 | 29.3 | 32.5 | 28.4 | 16.0 | 32.9 | 13.6 |

*measurement taken after rinsing debris from the surface

TABLE 9

% NOx Reduction in Ultraviolet Light (290 to 400 nm)

|  | Initial | 100 h | 400 h | 900 h | 900 h* | 1200 h |
|---|---|---|---|---|---|---|
| TEST 29 | 10.6 | 17.7 | 8.7 | 7.0 | 21.2 | 5.8 |
| TEST 30 | 10.3 | 17.7 | 13.8 | 8.5 | 25.1 | 4.7 |
| TEST 31 | 11.0 | 19.8 | 17.3 | 10.6 | 27.3 | 5.4 |

TABLE 9-continued

% NOx Reduction in Ultraviolet Light (290 to 400 nm)

|  | Initial | 100 h | 400 h | 900 h | 900 h* | 1200 h |
|---|---|---|---|---|---|---|
| TEST 32 | −0.4 | 1.3 | −0.8 | −0.4 | 0.0 | 1.7 |
| TEST 33 | −0.4 | 6.0 | 1.2 | 1.6 | 7.0 | 0.4 |
| TEST 34 | 6.8 | 11.7 | 5.4 | 3.3 | 14.6 | 1.3 |
| TEST 35 | 8.5 | 12.1 | 10.0 | 4.2 | 23.7 | 1.7 |
| TEST 36 | 53.4 | 48.0 | 42.3 | 37.5 | 56.4 | 33.2 |
| TEST 37 | 46.6 | 48.1 | 49.8 | 47.5 | 66.5 | 40.4 |
| TEST 38 | 43.5 | 39.9 | 47.1 | 37.3 | 61.2 | 22.4 |
| TEST 39 | 40.4 | 39.1 | 36.5 | 28.1 | 47.5 | 27.2 |
| TEST 40 | 46.1 | 40.6 | 44.5 | 33.9 | 59.5 | 38.8 |
| TEST 41 | 53.8 | 49.8 | 47.1 | 47.1 | 60.0 | 31.3 |
| TEST 42 | 51.3 | 48.7 | 41.5 | 46.3 | 61.3 | 42.6 |

*measurement taken after rinsing debris from the surface

TABLE 10

L* Value for Samples Subjected to Ultraviolet Light (290 to 400 nm)

|  | Initial | 100 h | 400 h | 900 h |
|---|---|---|---|---|
| TEST 29 | 97.00 | 96.97 | 96.98 | 97.03 |
| TEST 30 | 96.17 | 96.18 | 96.20 | 96.17 |
| TEST 31 | 96.44 | 96.49 | 96.66 | 96.18 |
| TEST 32 | 95.81 | 95.96 | 95.77 | 95.84 |
| TEST 33 | 96.23 | 96.27 | 96.27 | 96.30 |
| TEST 34 | 96.31 | 96.41 | 96.50 | 96.56 |
| TEST 35 | 95.94 | 95.96 | 96.00 | 96.15 |
| TEST 36 | 96.93 | 96.95 | 96.88 | 96.91 |
| TEST 37 | 96.54 | 96.52 | 96.55 | 96.54 |
| TEST 38 | 96.23 | 96.15 | 96.36 | 96.54 |
| TEST 39 | 95.35 | 95.60 | 95.64 | 95.68 |
| TEST 40 | 95.43 | 95.85 | 95.91 | 95.88 |
| TEST 41 | 95.74 | 96.08 | 96.10 | 96.04 |
| TEST 42 | 95.48 | 95.74 | 95.82 | 95.92 |

TABLE 11 a* Value for Samples Subjected to Ultraviolet Light (290 to 400 nm)

|  | Initial | 100 h | 400 h | 900 h |
|---|---|---|---|---|
| TEST 29 | −0.86 | −0.95 | −0.78 | −0.76 |
| TEST 30 | −0.83 | −0.85 | −0.68 | −0.68 |
| TEST 31 | −0.87 | −0.89 | −0.68 | −0.67 |
| TEST 32 | −0.47 | −0.41 | −0.46 | −0.52 |
| TEST 33 | −0.52 | −0.76 | −0.63 | −0.50 |
| TEST 34 | −0.67 | −0.72 | −0.55 | −0.52 |
| TEST 35 | −0.74 | −0.91 | −0.64 | −0.61 |
| TEST 36 | −1.25 | −1.01 | −0.85 | −0.82 |
| TEST 37 | −1.26 | −1.04 | −0.83 | −0.83 |
| TEST 38 | −1.01 | −0.92 | −0.72 | −0.67 |
| TEST 39 | −1.14 | −0.65 | −0.51 | −0.53 |
| TEST 40 | −1.35 | −0.80 | −0.63 | −0.54 |
| TEST 41 | −1.73 | −0.76 | −0.63 | −0.56 |
| TEST 42 | −1.50 | −0.91 | −0.65 | −0.60 |

TABLE 12 b* Value for Samples Subjected to Ultraviolet Light (290 to 400 nm)

|  | Initial | 100 h | 400 h | 900 h |
|---|---|---|---|---|
| TEST 29 | 1.14 | 1.41 | 1.09 | 1.08 |
| TEST 30 | 1.03 | 1.15 | 0.80 | 0.68 |
| TEST 31 | 1.65 | 1.64 | 1.15 | 0.89 |
| TEST 32 | 1.84 | 1.70 | 1.75 | 2.01 |
| TEST 33 | 1.86 | 2.48 | 2.15 | 2.20 |
| TEST 34 | 2.50 | 2.43 | 1.81 | 1.61 |
| TEST 35 | 2.34 | 2.87 | 1.96 | 1.76 |
| TEST 36 | 2.18 | 1.85 | 1.50 | 1.34 |

TABLE 12-continued b* Value for Samples Subjected to Ultraviolet Light (290 to 400 nm)

|  | Initial | 100 h | 400 h | 900 h |
|---|---|---|---|---|
| TEST 37 | 2.31 | 1.93 | 1.50 | 1.48 |
| TEST 38 | 2.14 | 1.94 | 1.37 | 1.20 |
| TEST 39 | 3.66 | 2.19 | 1.95 | 1.74 |
| TEST 40 | 4.85 | 2.81 | 2.15 | 1.97 |
| TEST 41 | 5.55 | 2.53 | 2.07 | 1.81 |
| TEST 42 | 4.61 | 3.05 | 2.18 | 2.06 |

Example 3

The ability of various coating materials in various combinations to reduce NOx concentration was evaluated. Coating materials used in the evaluation are shown in TABLE 13.

TABLE 13

| Material | Description |
|---|---|
| Coating material 13 | White, styrene acrylic paint (Materis) with 2% nano TiO$_2$ (Innovcoat) |
| Coating material 14 | White, styrene acrylic paint (Materis) with 2% nano TiO$_2$ (Cristal PCS-S6) |
| Coating material 15 | White, styrene acrylic paint (Cristal) with 2% nano TiO$_2$ (Innovcoat) |
| Coating material 16 | White, styrene acrylic paint (Cristal) with 8% nano TiO$_2$ (Cristal 22% PCX-S6) |
| Coating material 17 | White, styrene acrylic paint (Cristal) with 2% nano TiO$_2$ (Cristal 5.5% PCX-S6) |
| Coating material 18 | CristalACTiV ™ PCS7: transparent TiO$_2$ sol (1 wt %) |
| Coating material 19 | CristalACTiV ™ PCS7: transparent TiO$_2$ sol (5 wt %) |
| Coating material 20 | CristalACTiV ™ PCS7: transparent TiO$_2$ sol (10 wt %) |

The paint used in coating materials 13 and 14 was general styrene acrylic paints. The paint used in coating materials 15-17 were a formulation as described in U.S. Pat. Pub. No. 2014/0322116 to Maltby et al. In coating materials 13 and 15, the nano TiO$_2$ included a silica coating on the particles. In coating materials 14, 16, and 17, the nano TiO$_2$ particles were added to the paint in slurry form.

TESTS 43 and 66 were a layer of coating material 13 on concrete.

TESTS 44 and 67 were a layer of coating material 13 on concrete covered with a layer of coating material 18.

TESTS 45 and 68 were a layer of coating material 13 on concrete covered with a layer of coating material 19.

TESTS 46 and 69 were a layer of coating material 13 on concrete covered with a layer of coating material 20.

TESTS 47 and 70 were a layer of coating material 14 on concrete.

TESTS 48 and 71 were a layer of coating material 14 on concrete covered with a layer of coating material 18.

TESTS 49 and 72 were a layer of coating material 14 on concrete covered with a layer of coating material 19.

TESTS 50 and 73 were a layer of coating material 14 on concrete covered with a layer of coating material 20.

TESTS 51 and 74 were a layer of coating material 15 on concrete.

TESTS 52 and 75 were a layer of coating material 15 on concrete covered with a layer of coating material 18.

TESTS 53 and 76 were a layer of coating material 15 on concrete covered with a layer of coating material 19.

TESTS 54 and 77 were a layer of coating material 15 on concrete covered with a layer of coating material 20.

TESTS 55 and 78 were a layer of coating material 16 on concrete.

TESTS 56 and 79 were a layer of coating material 16 on concrete covered with a layer of coating material 18.

TESTS 57 and 80 were a layer of coating material 16 on concrete covered with a layer of coating material 19.

TESTS 58 and 81 were a layer of coating material 16 on concrete covered with a layer of coating material 20.

TESTS 59 and 82 were a layer of coating material 17 on concrete.

TESTS 60 and 83 were a layer of coating material 17 on concrete covered with a layer of coating material 18.

TESTS 64 and 84 were a layer of coating material 17 on concrete covered with a layer of coating material 19.

TESTS 62 and 85 were a layer of coating material 17 on concrete covered with a layer of coating material 20.

TESTS 63 and 86 were a coating layer of coating material 18 alone on concrete.

TESTS 64 and 87 were a coating layer of coating material 19 alone on concrete.

TESTS 65 and 88 were a coating layer of coating material 20 alone on concrete.

Each test sample had a surface area of approximately 18 cm$^2$, and testing was carried out in the Suntest Chamber as in Example 1. Initial readings were taken, and follow-up readings were obtained after 100 hours, 250 hours, 400 hours, 700 hours, 1000 hours, and 1300 hours aging in the Suntest chamber. During aging in the Suntest chamber, the samples were subjected to light in a spectrum of 250-765 nm at 550 w/m$^2$. For the evaluations, the samples were placed in a NOx analyzer under a flow of NO at approximately 0.6 L/min and 50% relative humidity. Readings were taken under applied fluorescent light (spectrum of 400 to 750 nm) at 7.22 W/m$^2$ and under ultraviolet light (spectrum of 290 to 400 nm) at 6.63 W/m$^2$. For each test, NOx concentration readings were taken without the applied light and then again with the applied light to evaluate the reduction of NOx under the photocatalytic conditions.

Test result data is provided in TABLE 14 and TABLE 15 below. The test results are graphically illustrated in FIG. 6 through FIG. 9. The % NOx Reduction was calculated according to Formula 1. Visual appearance of the color of the test samples was also evaluated during testing under ultraviolet light conditions. The visual evaluation of the samples is provided in TABLE 16. Additionally, L*, a*, and b* values for the various test samples are provided in TABLE 17 through TABLE 19. Testing showed that the combination of the transparent TiO$_2$ sol over a white coating layer provided improved NOx reduction on average. Such improvement was generally identified in comparison to coatings of the white layer alone or the transparent TiO$_2$ sol alone.

TABLE 14

% NOx Reduction in Fluorescent Light (400 to 750 nm)

|  | Initial | 100 h | 250 h | 400 h | 700 h | 1000 h | 1300 h |
| --- | --- | --- | --- | --- | --- | --- | --- |
| TEST 43 | 0.9 | 0.4 | −0.4 | 0.0 | 0.0 | 0.0 | 0.0 |
| TEST 44 | 11.0 | 9.5 | 4.7 | 4.4 | 4.8 | 4.3 | 3.0 |
| TEST 45 | 33.3 | 31.3 | 12.6 | 14.0 | 19.5 | 24.6 | 16.6 |
| TEST 46 | 46.4 | 46.0 | 20.8 | 12.1 | 24.3 | 35.2 | 13.6 |
| TEST 47 | 0.0 | −0.4 | −0.4 | 1.3 | 0.4 | 0.4 | 1.3 |
| TEST 48 | 8.8 | 18.1 | 7.5 | 9.0 | 9.2 | 12.1 | 6.0 |
| TEST 49 | 37.2 | 30.3 | 19.8 | 15.2 | 23.8 | 31.9 | 19.7 |

TABLE 14-continued

% NOx Reduction in Fluorescent Light (400 to 750 nm)

|  | Initial | 100 h | 250 h | 400 h | 700 h | 1000 h | 1300 h |
| --- | --- | --- | --- | --- | --- | --- | --- |
| TEST 50 | 42.2 | 35.3 | 17.1 | 17.4 | 26.1 | 31.6 | 20.7 |
| TEST 51 | 0.0 | 0.4 | 1.7 | 0.4 | 0.4 | 0.4 | 0.0 |
| TEST 52 | 7.5 | 6.9 | 3.1 | 4.3 | 4.8 | 5.6 | 5.6 |
| TEST 53 | 23.9 | 22.8 | 10.7 | 12.1 | 11.2 | 20.5 | 20.2 |
| TEST 54 | 29.7 | 14.6 | 14.8 | 13.6 | 12.6 | 20.1 | 6.5 |
| TEST 55 | 1.3 | 14.4 | 11.1 | 11.6 | 11.8 | 6.4 | 6.8 |
| TEST 56 | 8.7 | 14.0 | 16.0 | 13.8 | 15.2 | 14.5 | 13.0 |
| TEST 57 | 31.1 | 28.6 | 26.6 | 23.8 | 31.3 | 31.0 | 24.7 |
| TEST 58 | 37.3 | 28.3 | 37.6 | 33.9 | 39.9 | 45.1 | 29.6 |
| TEST 59 | 0.0 | 0.8 | 0.0 | 1.3 | 0.4 | 2.1 | 3.4 |
| TEST 60 | 5.7 | 10.1 | 4.3 | 3.9 | 8.3 | 7.2 | 5.2 |
| TEST 61 | 21.7 | 11.5 | 10.0 | 12.0 | 12.6 | 14.8 | 12.8 |
| TEST 62 | 36.8 | 23.2 | 19.6 | 17.9 | 26.7 | 27.7 | 28.6 |
| TEST 63 | 7.1 | 11.2 | 3.9 | 4.3 | 5.5 | 6.3 | 3.0 |
| TEST 64 | 21.4 | 19.1 | 8.7 | 14.7 | 6.9 | 11.0 | 7.7 |
| TEST 65 | 28.5 | 26.2 | 9.1 | 18.7 | 18.4 | 25.3 | 20.4 |

TABLE 15

% NOx Reduction in Ultraviolet Light (290 to 400 nm)

|  | Initial | 100 h | 250 h | 400 h | 700 h | 1000 h | 1300 h |
| --- | --- | --- | --- | --- | --- | --- | --- |
| TEST 66 | 4.3 | 1.3 | −0.4 | 0.9 | 2.2 | 0.0 | 0.4 |
| TEST 67 | 31.3 | 20.8 | 16.8 | 10.5 | 12.6 | 12.0 | 7.7 |
| TEST 68 | 59.1 | 49.1 | 33.0 | 36.6 | 38.5 | 52.6 | 33.2 |
| TEST 69 | 59.4 | 47.7 | 41.2 | 37.2 | 40.9 | 51.9 | 38.7 |
| TEST 70 | 1.3 | 2.5 | 0.4 | 1.7 | 1.3 | 1.3 | 3.4 |
| TEST 71 | 32.5 | 23.2 | 22.4 | 17.9 | 18.3 | 25.9 | 14.0 |
| TEST 72 | 61.9 | 52.1 | 51.5 | 38.3 | 50.6 | 58.3 | 40.8 |
| TEST 73 | 61.9 | 44.8 | 45.2 | 40.9 | 46.1 | 59.0 | 44.4 |
| TEST 74 | 1.3 | 2.6 | 3.1 | 2.6 | 1.3 | 1.3 | 0.4 |
| TEST 75 | 23.2 | 18.5 | 15.5 | 10.9 | 13.9 | 19.8 | 11.6 |
| TEST 76 | 49.1 | 47.0 | 45.5 | 40.5 | 46.6 | 51.3 | 43.8 |
| TEST 77 | 59.9 | 53.6 | 54.7 | 36.4 | 52.4 | 61.1 | 40.1 |
| TEST 78 | 7.7 | 15.3 | 12.8 | 12.5 | 16.7 | 14.0 | 9.8 |
| TEST 79 | 22.3 | 16.7 | 21.2 | 17.3 | 18.7 | 25.6 | 15.1 |
| TEST 80 | 51.8 | 36.6 | 41.2 | 37.2 | 37.1 | 35.8 | 27.2 |
| TEST 81 | 61.0 | 59.3 | 56.6 | 59.2 | 60.5 | 60.9 | 46.8 |
| TEST 82 | 0.9 | 5.4 | 1.3 | 3.9 | 3.0 | 2.6 | 4.6 |
| TEST 83 | 21.4 | 18.9 | 13.0 | 10.5 | 12.7 | 21.2 | 11.6 |
| TEST 84 | 51.3 | 41.7 | 40.6 | 39.9 | 35.2 | 43.2 | 31.1 |
| TEST 85 | 65.8 | 62.4 | 62.6 | 48.0 | 60.3 | 61.7 | 55.2 |
| TEST 86 | 26.5 | 22.4 | 11.2 | 12.1 | 13.6 | 21.5 | 10.8 |
| TEST 87 | 50.7 | 37.4 | 32.6 | 35.3 | 31.0 | 41.5 | 30.2 |
| TEST 88 | 59.6 | 52.4 | 36.6 | 44.3 | 49.6 | 51.5 | 43.5 |

TABLE 16

Visual Appearance of Coated Cement Samples Subjected to Ultraviolet Light (290 to 400 nm)

|  | Initial | 100 h | 250 h | 400 h |
|---|---|---|---|---|
| TEST 66 | white | white | white | white |
| TEST 67 | white | white | white | white |
| TEST 68 | pale yellow | shiny white | shiny white | shiny white |
| TEST 69 | yellow | shiny creamy white | shiny creamy white | shiny creamy white |
| TEST 70 | white | white | white | white |
| TEST 71 | white | white | white | white |
| TEST 72 | pale yellow | shiny white | shiny white | shiny white |
| TEST 73 | yellow | shiny creamy white | shiny creamy white | shiny creamy white |
| TEST 74 | white | white | white | white |
| TEST 75 | white | white | white | white |
| TEST 76 | pale yellow | shiny white | shiny white | shiny white |
| TEST 77 | yellow | shiny creamy white | shiny creamy white | shiny creamy white |
| TEST 78 | white | white | white | white |
| TEST 79 | white | white | white | white |
| TEST 80 | pale yellow | shiny white | shiny white | shiny white |
| TEST 81 | yellow | shiny creamy white | shiny creamy white | shiny creamy white |
| TEST 82 | white | white | white | white |
| TEST 83 | white | white | white | white |
| TEST 84 | pale yellow | shiny white | shiny white | shiny white |
| TEST 85 | yellow | shiny creamy white | shiny creamy white | shiny creamy white |
| TEST 86 | clear | clear | clear | clear |
| TEST 87 | fairly clear | clear | clear | clear |
| TEST 88 | pale yellow | dusty white | dusty white | dusty white |

TABLE 17

L* Value for Samples Subjected to Ultraviolet Light (290 to 400 nm)

|  | Initial | 100 h | 250 h | 400 h | 700 h | 1000 h | 1300 h |
|---|---|---|---|---|---|---|---|
| TEST 66 | 96.09 | 96.13 | 96.11 | 96.1 | 96.15 | 96.12 | 96.32 |
| TEST 67 | 95.87 | 95.82 | 95.91 | 95.9 | 95.93 | 95.95 | 96.05 |
| TEST 68 | 95.60 | 95.65 | 95.58 | 95.6 | 95.59 | 95.52 | 95.79 |
| TEST 69 | 95.30 | 95.46 | 95.59 | 95.6 | 95.69 | 95.68 | 95.84 |
| TEST 70 | 95.63 | 95.51 | 95.70 | 95.7 | 95.80 | 95.84 | 95.98 |
| TEST 71 | 95.84 | 95.81 | 95.99 | 96.0 | 96.09 | 96.10 | 96.24 |
| TEST 72 | 95.30 | 95.21 | 95.41 | 95.4 | 95.47 | 95.58 | 95.74 |
| TEST 73 | 94.74 | 95.11 | 94.94 | 95.2 | 95.17 | 95.18 | 95.43 |
| TEST 74 | 95.39 | 95.42 | 95.22 | 95.4 | 95.38 | 95.38 | 95.52 |
| TEST 75 | 95.89 | 95.9 | 95.87 | 95.9 | 95.91 | 95.85 | 96.02 |
| TEST 76 | 94.89 | 95.27 | 94.98 | 95.2 | 95.27 | 95.15 | 95.56 |
| TEST 77 | 95.75 | 95.77 | 95.73 | 95.8 | 95.69 | 95.65 | 95.76 |
| TEST 78 | 96.89 | 96.62 | 96.69 | 96.8 | 96.91 | 96.93 | 97.15 |
| TEST 79 | 96.71 | 96.43 | 96.46 | 96.5 | 96.56 | 96.53 | 96.77 |
| TEST 80 | 96.38 | 96.2 | 96.21 | 96.3 | 96.14 | 95.85 | 96.27 |
| TEST 81 | 96.17 | 96.02 | 96.05 | 96.2 | 96.13 | 95.91 | 96.44 |
| TEST 82 | 95.80 | 95.66 | 95.68 | 95.6 | 95.50 | 95.74 | 95.78 |
| TEST 83 | 95.45 | 95.51 | 95.46 | 95.3 | 95.64 | 95.42 | 95.70 |
| TEST 84 | 95.66 | 95.58 | 95.66 | 95.6 | 95.37 | 95.36 | 95.48 |
| TEST 85 | 95.17 | 95.28 | 95.34 | 95.3 | 95.40 | 95.38 | 95.65 |

TABLE 18 a* Value for Samples Subjected to Ultraviolet Light (290 to 400 nm)

|  | Initial | 100 h | 250 h | 400 h | 700 h | 1000 h | 1300 h |
|---|---|---|---|---|---|---|---|
| TEST 66 | −0.45 | −0.68 | −0.59 | −0.55 | −0.54 | −0.56 | −0.55 |
| TEST 67 | −0.97 | −0.68 | −0.57 | −0.56 | −0.57 | −0.62 | −0.61 |
| TEST 68 | −1.50 | −0.77 | −0.57 | −0.54 | −0.58 | −0.72 | −0.53 |
| TEST 69 | −2.53 | −0.92 | −0.58 | −0.56 | −0.56 | −0.71 | −0.49 |
| TEST 70 | −0.56 | −0.68 | −0.61 | −0.62 | −0.61 | −0.60 | −0.57 |
| TEST 71 | −0.87 | −0.65 | −0.55 | −0.52 | −0.56 | −0.65 | −0.50 |
| TEST 72 | −1.52 | −0.70 | −0.61 | −0.58 | −0.63 | −0.74 | −0.58 |
| TEST 73 | −2.06 | −0.81 | −0.60 | −0.61 | −0.65 | −0.80 | −0.61 |
| TEST 74 | −0.73 | −0.85 | −0.83 | −0.83 | −0.85 | −0.88 | −0.82 |
| TEST 75 | −0.84 | −0.83 | −0.79 | −0.78 | −0.80 | −0.93 | −0.78 |
| TEST 76 | −1.47 | −0.94 | −0.87 | −0.84 | −0.86 | −1.14 | −0.83 |
| TEST 77 | −2.26 | −0.94 | −0.84 | −0.83 | −0.86 | −1.22 | −0.85 |
| TEST 78 | −0.97 | −1.03 | −1.03 | −0.98 | −0.97 | −1.06 | −0.88 |
| TEST 79 | −0.95 | −1.23 | −0.99 | −0.96 | −0.92 | −1.00 | −0.84 |
| TEST 80 | −1.41 | −1.25 | −0.98 | −0.94 | −0.97 | −1.06 | −0.87 |
| TEST 81 | −3.41 | −1.44 | −1.06 | −1.00 | −1.01 | −1.13 | −0.84 |
| TEST 82 | −0.77 | −0.89 | −0.91 | −0.91 | −0.92 | −0.96 | −0.87 |
| TEST 83 | −0.94 | −0.93 | −0.85 | −0.81 | −0.84 | −0.94 | −0.80 |
| TEST 84 | −1.36 | −1.00 | −0.91 | −0.87 | −0.89 | −1.04 | −0.86 |
| TEST 85 | −3.28 | −1.17 | −0.91 | −0.90 | −0.91 | −1.29 | −0.85 |

TABLE 19 b* Value for Samples Subjected to Ultraviolet Light (290 to 400 nm)

|  | Initial | 100 h | 250 h | 400 h | 700 h | 1000 h | 1300 h |
|---|---|---|---|---|---|---|---|
| TEST 66 | 2.29 | 2.75 | 2.46 | 2.48 | 2.42 | 2.39 | 2.18 |
| TEST 67 | 3.00 | 2.68 | 2.04 | 1.97 | 1.92 | 2.09 | 2.05 |
| TEST 68 | 4.37 | 2.99 | 2.20 | 2.09 | 2.13 | 2.35 | 1.71 |
| TEST 69 | 7.05 | 3.61 | 2.69 | 2.46 | 2.47 | 2.68 | 1.98 |
| TEST 70 | 2.44 | 2.93 | 2.40 | 2.31 | 2.29 | 2.30 | 1.98 |
| TEST 71 | 3.24 | 2.92 | 2.35 | 2.28 | 2.23 | 2.50 | 1.86 |
| TEST 72 | 4.47 | 2.88 | 2.38 | 2.34 | 2.34 | 2.43 | 1.84 |
| TEST 73 | 5.51 | 2.73 | 1.96 | 2.05 | 2.00 | 2.19 | 1.44 |
| TEST 74 | 0.91 | 1.13 | 1.05 | 1.17 | 1.25 | 1.34 | 1.11 |
| TEST 75 | 1.46 | 1.43 | 1.32 | 1.34 | 1.40 | 1.74 | 1.17 |
| TEST 76 | 2.27 | 1.43 | 1.03 | 1.24 | 1.21 | 1.73 | 1.16 |
| TEST 77 | 4.83 | 1.99 | 1.85 | 1.80 | 1.76 | 2.52 | 1.63 |
| TEST 78 | 1.97 | 3.11 | 2.66 | 2.41 | 2.41 | 2.53 | 1.85 |
| TEST 79 | 2.15 | 3.03 | 2.57 | 2.43 | 2.44 | 2.59 | 1.82 |
| TEST 80 | 3.31 | 3.58 | 3.03 | 2.81 | 2.76 | 2.86 | 2.00 |
| TEST 81 | 7.27 | 3.91 | 3.03 | 2.89 | 3.03 | 3.26 | 2.16 |
| TEST 82 | 1.12 | 1.34 | 1.48 | 1.44 | 1.56 | 1.90 | 1.46 |
| TEST 83 | 1.41 | 1.51 | 1.38 | 1.24 | 1.64 | 1.90 | 1.42 |
| TEST 84 | 2.55 | 1.87 | 1.78 | 1.84 | 1.66 | 2.01 | 1.32 |
| TEST 85 | 6.52 | 2.23 | 1.88 | 1.83 | 1.94 | 2.60 | 1.52 |

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A layered construct comprising:
   a base;
   a first coating layer on the base, the first coating layer being adapted to reflect at least about 60% of incident light, wherein the first coating exhibits an L* value that is greater than about 90; and
   a second coating layer over the first coating layer, the second coating layer being substantially transparent or translucent and comprising photocatalytic titanium dioxide, wherein the second coating layer exhibits an average transmission over the wavelengths of from 400 nm to 700 nm of at least about 50%.

2. The layered construct according to claim 1, wherein the base is cementitious, wood, metal, masonry, plastic, paper, or gypsum.

3. The layered construct according to claim 1, wherein the first coating layer is a paint.

4. The layered construct according to claim 1, wherein the first coating layer has a visible color that is a shade of white.

5. The layered construct according to claim 1, wherein the first coating has a color that is defined by an L* value that is greater than about 90, an a* value of about −5 to about +5, and a b* value of about −2 and about +10.

6. The layered construct according to claim 5, wherein one of the following conditions is met:
   after 100 hours of exposure to UV light, the color of the first coating is defined by an L* value of 95.0 to 97.0, an a* value of −1.50 to −0.50, and a b* value of 1.0 to 4.0;
   after 1300 hours of exposure to UV light, the color of the first coating is defined by an L* value of 95.0 to 97.5, an a* value of −1.00 to −0.45, and a b* value of 1.0 to 2.5.

7. The layered construct according to claim 1, wherein the second coating layer comprises about 0.1% to about 30% by weight titanium dioxide.

8. The layered construct according to claim 1, wherein the photocatalytic titanium dioxide is in the form of particles having an average size of less than 100 nm.

9. The layered construct according to claim 1, wherein the first coating layer comprises a white pigment.

10. The layered construct according to claim 1, wherein the second coating layer is adapted to catalyze the oxidation of NOx.

11. The layered construct according to claim 10, wherein the combination of the second coating layer over the first coating layer is effective to catalyze the oxidation of NOx at an increased rate relative to the second coating layer by itself.

12. The layered construct according to claim 11, wherein the oxidation of NOx by the combination of the second coating layer over the first coating layer is greater than the oxidation of NOx by the second layer by itself by at least about 10%.

13. A method of removing NOx in the vicinity of a base structure, the method comprising:
   providing at least a portion of a surface of the base structure with a layer of a first coating material, the first coating layer being adapted to reflect at least about 60% of incident light, wherein the first coating exhibits an L* value that is greater than about 90; and
   providing a layer of a second coating material over the layer of the first coating material, the second coating material being substantially transparent or translucent and comprising photocatalytic titanium dioxide in an amount effective to catalyze the oxidation of at least a portion of the NOx in the vicinity of the base structure, wherein the layer of the second coating material exhibits an average transmission over the wavelengths of from 400 nm to 700 nm of at least about 50%.

14. The method according to claim 13, wherein the base structure is a parking garage or a roadway structure.

15. A method of improving NOx reduction by a photocatalytic TiO$_2$ material, the method comprising:
   combining a transparent or translucent layer comprising the photocatalytic TiO$_2$ material with a further layer of a material that is adapted to reflect at least about 60% of incident light such that the transparent or translucent layer is overlying the further layer;
   wherein the combination of the transparent or translucent layer over the further layer is effective to catalyze the oxidation of NOx at an increased rate relative to the transparent or translucent layer by itself;
   wherein the further layer of material exhibits an L* value that is greater than 90; and
   wherein the transparent or translucent layer exhibits an average transmission over the wavelengths of from 400 to 700 nm of at least about 50%.

16. The method according to claim 15, wherein the oxidation of NOx by the combination of the transparent or translucent layer over the further layer is greater than the oxidation of NOx by the transparent or translucent layer by itself by at least about 10%.

17. The method according to claim 15, wherein the further layer of a material has a visible color that is a shade of white.

18. The method according to claim 15, wherein the further layer of a material has a color that is defined by an L* value that is greater than about 90, an a* value of about −5 to about +5, and a b* value of about −2 to about +10.

19. The method according to claim 18, wherein one of the following conditions is met:
   after 100 hours of exposure to UV light, the color of the further layer of a material is defined by an L* value of 95.0 to 97.0, an a* value of −1.50 to −0.50, and a b* value of 1.0 to 4.0;
   after 1300 hours of exposure to UV light, the color of the further layer of a material is defined by an L* value of 95.0 to 97.5, an a* value of −1.00 to −0.45, and a b* value of 1.0 to 2.5.

20. The method according to claim 13, wherein the further layer of a material has a visible color that is a shade of white.

21. The method according to claim 13, wherein the further layer of a material has a color that is defined by an L* value that is greater than about 90, an a* value of about −5 to about +5, and a b* value of about −2 to about +10.

22. The method according to claim 21, wherein one of the following conditions is met:
   after 100 hours of exposure to UV light, the color of the further layer of a material is defined by an L* value of 95.0 to 97.0, an a* value of −1.50 to −0.50, and a b* value of 1.0 to 4.0;

after 1300 hours of exposure to UV light, the color of the further layer of a material is defined by an L* value of 95.0 to 97.5, an a* value of −1.00 to −0.45, and a b* value of 1.0 to 2.5.

* * * * *